(12) United States Patent
Joinson et al.

(10) Patent No.: US 9,501,519 B1
(45) Date of Patent: Nov. 22, 2016

(54) GRAPHICAL ITEM CHOOSER

(75) Inventors: Simon Ashley Joinson, West Sussex (GB); Jan Zich, London (GB)

(73) Assignee: Amazon Technologies, Inc., Reno, NV (US)

( * ) Notice: Subject to any disclaimer, the term of this patent is extended or adjusted under 35 U.S.C. 154(b) by 652 days.

(21) Appl. No.: 12/637,199

(22) Filed: Dec. 14, 2009

(51) Int. Cl.
*G06F 17/30* (2006.01)

(52) U.S. Cl.
CPC ... *G06F 17/30398* (2013.01); *G06F 17/30867* (2013.01); *G06F 17/30253* (2013.01); *G06F 17/30256* (2013.01)

(58) Field of Classification Search
CPC .................................................. G06F 17/30398
USPC .................................................. 707/754, 766
See application file for complete search history.

(56) References Cited

U.S. PATENT DOCUMENTS

| | | | |
|---|---|---|---|
| 6,778,193 B2 * | 8/2004 | Biebesheimer et al. ...... 715/805 |
| 7,080,071 B2 * | 7/2006 | Henrion et al. .............. 707/713 |
| 7,283,992 B2 * | 10/2007 | Liu et al. | |
| 7,596,505 B2 * | 9/2009 | Keil et al. .................... 705/7.32 |
| 8,054,170 B1 * | 11/2011 | Brandt ................. G06K 9/4676 340/453 |
| 8,260,771 B1 * | 9/2012 | Ortega et al. ................. 707/723 |
| 2002/0174022 A1 * | 11/2002 | Tenorio ............................ 705/26 |
| 2004/0148210 A1 * | 7/2004 | Barrett ............... G06Q 30/0203 705/7.32 |
| 2007/0282703 A1 * | 12/2007 | Sharpe et al. ................... 705/26 |
| 2008/0118151 A1 * | 5/2008 | Bouguet et al. .............. 382/181 |
| 2008/0255967 A1 * | 10/2008 | Shi .................................. 705/27 |
| 2009/0070321 A1 * | 3/2009 | Apartsin et al. .................. 707/5 |
| 2009/0299824 A1 * | 12/2009 | Barnes, Jr. ...................... 705/10 |
| 2011/0055203 A1 * | 3/2011 | Gutt et al. ..................... 707/722 |
| 2011/0106594 A1 * | 5/2011 | Shirey .......................... 705/14.4 |

* cited by examiner

*Primary Examiner* — Brittany N Allen
(74) *Attorney, Agent, or Firm* — Lee & Hayes, PLLC

(57) ABSTRACT

A graphical item chooser sorts candidate products or services by initially classifying each of one or more objective icons as a primary objective icon or a secondary objective icon. Each objective icon represents one or more desired characteristics of a product or service that facilitates a particular objective. The graphical item chooser may further determine at least one most desired characteristic of the ideal product or service. The determination is made based on a frequency that each desired characteristic is represented by the one or more objective icons. Having made the determination, the graphical item chooser then sorts the candidate products or services based at least on similarities between one or more characteristics of each candidate product or service and the at least one most desired characteristic. Following the sort, the graphical item chooser generates a sorted list of suitable products or services.

34 Claims, 13 Drawing Sheets

FIG. 6b

GRAPHICAL ITEM CHOOSER

BACKGROUND

Consumers may rely on shopping search engines to find competitive retailers of products and services while shopping online. However, while shopping search engines may enable consumers to make their purchasing decisions based on price, they do not provide consumers with the expert assistance for selecting the one product or service that actually suits their needs. Consumers may attempt to find the right product or service by conducting their research online via review and information sites, but such research may be tedious, time consuming, and/or difficult for average consumers to carry out. Thus, consumers may end up with products or services that are inadequate for their needs, or products or services with features that the consumers do not desire. In addition, consumers often pay premiums for the undesired features.

In some instances, consumers may actually forego the online shopping experience and visit brick-and-mortar retailers to receive personalized assistance with the selection of the appropriate products or services. As a result, online retailers may lose sales and profits despite having the most competitive prices. Moreover, consumers often have no assurance that the assistance received at brick-and-mortar retailers are adequate, as there is no guarantee that sales associates at such retailers have the necessary training, knowledge, motivation, or skills to recommend the appropriate product or service.

Moreover, scenarios involving decision making based on imperfect information is not limited to online retail settings, consumers often have to make decisions choices based on limited information or expertise in other aspects of their lives.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIGS. 6a and 6b show an illustrative user interface screen of the graphical item chooser that enables customization of the product or service recommendations, in accordance with one or more embodiments.

DETAILED DESCRIPTION

Overview

The disclosure is directed, in part, to a graphical item chooser that enables a user to select an appropriate product or service without searching for information from multiple sources. For example, the user may use the graphical item chooser to select the appropriate product or service without having to visit different information websites, different review websites, and/or multiple online shopping search engines. In various embodiments, the graphical item chooser may be a web browser based application that runs on an electronic device. Thus, the graphical item chooser may contain the most up-to-date information. However, in additional embodiments, the graphic item chooser may also be a standalone application running on the electronic device. The electronic device may be a general purpose computer, a home theater personal computer (PC), or a dedicated device (e.g., a web browsing appliance, a point-of service (POS) device, and the like).

As described herein, the graphical item chooser may include an icon-based user interface that enables the user to intuitively select and rank the desired objectives that the user hopes to achieve with an ideal product or service, as well as select and rank characteristics that the user wants or does not want in the ideal product or service. In return, the graphical item chooser may provide recommended products or services based on the most desired objectives, as well as the most ideal characteristics. The graphical item chooser may further provide the user with price information on the recommended products or services. In this way, the graphical item chooser may provide the user with sufficient information to select the appropriate product or service, as well as obtain the appropriate product or service at a competitive price. As a result, the likelihood that the user may select a product or service that does not meet needs, or a product or service that includes undesirable features, may be reduced.

For the purpose of discussion, the graphical item chooser is described in this disclosure with respect to selecting an item for purchase, such as a digital camera. However, it will be appreciated that the graphical item chooser may be implemented for other products and services, whether offered for sale or otherwise. For instance, the described techniques may enable a user to select a travel destination, a restaurant to at which to dine, a university or college to attend, one or more users to interact with (e.g., socially, romantically, etc.), a career to pursue or any other similar or different product or service. Moreover, an illustrative environment and techniques for implementing the graphical item chooser is provided below. However, the described graphical item chooser may be implemented in other environments.

Illustrative System Architecture

Figure 1:
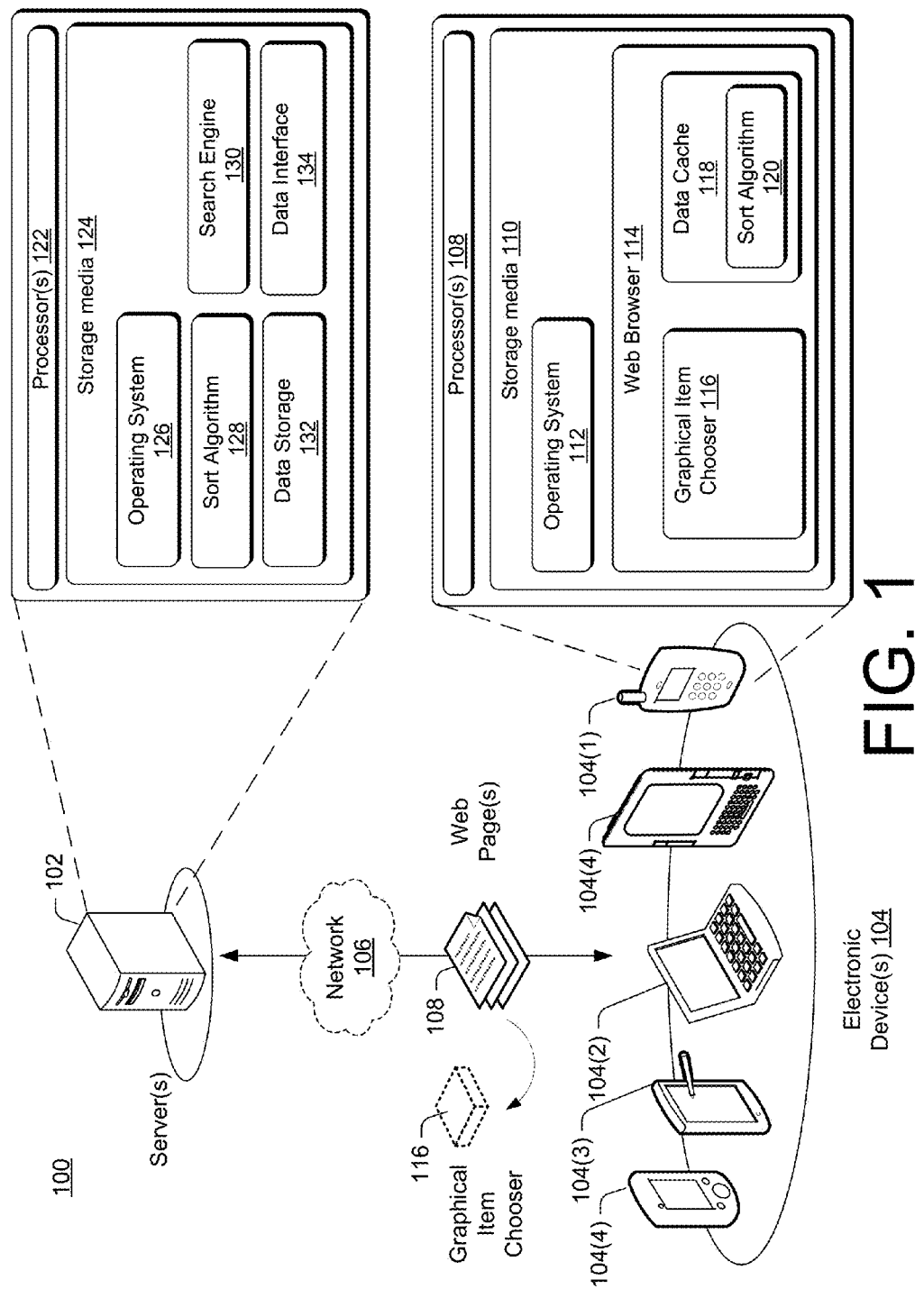
FIG. 1 shows an illustrative computing environment in which one or more embodiments of the graphical item chooser may be implemented, in accordance with one or more embodiments.

FIG. 1 shows an illustrative computing environment 100 in which one or more embodiments of the graphical item chooser may be implemented, in accordance with one or more embodiments. The environment 100 may include one or more servers 102 and a plurality of electronic devices 104 that are communicatively connected by a network 106. The one or more servers 102 may be located in a single data center, or across multiple data centers. In addition, the techniques described below may be implemented in non-client/server environments.

The network 106 may be a local area network ("LAN"), a larger network such as a wide area network ("WAN"), or a collection of networks, such as the Internet. Protocols for network communication, such as TCP/IP, may be used to implement the network 106. Although embodiments are described herein as using a network such as the Internet, other distribution techniques may be implemented. The electronic devices 104 may include a mobile phone 104(1), a portable computer 104(2), a tablet computer 104(3), an e-book reader 104(4), a personal digital assistant (PDA) 104(N), and/or other electronic devices that are equipped with network communication components, data processing components, and electronic displays for displaying data.

In one or more embodiments, each of the electronic devices 104 may be implemented with the graphical item chooser 116. In various embodiments, the graphical item chooser 116 may be implemented as a browser-based or other client-based application. Accordingly, the graphical item chooser 116 may be provided by the server 102 to the devices 104 via the network 106. In turn, the graphical item chooser may be displayed on the electronic displays of the electronic devices 104. Each of the electronic display may be a liquid crystal display (LCD), organic light emitting diode (OLED) display, a plasma display, an electronic paper display, or any other form of electronic display that is capable presenting data.

Each of the electronic devices 104 may further include user controls that enable a user to interact with the device. User controls may include, but are not limited to, combinations of one or more of keypads, keyboards, mouse devices, touch screens, microphones, speech recognition packages, and any other suitable devices or other electronic/software selection methods. Moreover, as further described below, each of the electronic devices 104 may also include a memory for storing the graphical item chooser and its associated product and service data.

As shown in FIG. 1, each of the electronic devices 104 may include one or more processors 108 and a storage media 110. The modules may include routines, programs, objects, components, and data structures that cause the electronic device 104 to perform particular tasks. The storage media 110 may store an operating system 112, a web browser 114, as well as other modules.

The operating system 112 may include components that enable an electronic device 104 to receive data via various inputs (e.g., user controls, network interfaces, and/or memory devices), process data using the one or more processors 108 to generate output. The operating system 112 may include a display component that presents the output (e.g., display the digital image on an electronic display, store data in memory, transmit data to another electronic device, etc.). Additionally, the operating system 112 may include other components that perform various other functions generally associated with an operating system.

The web browser 114 may implement the graphical item chooser 116. Moreover, the graphical item chooser 116 may store its data in a data cache 118 of the web browser 114. As further described below, such data may include, but not limited to, a sort algorithm 120, review rating data, hyperlink data, characteristics and/or features of various products or services, as well as other data used by the graphical item chooser 116.

In operation, the web browser 114 may download one or more web pages 108 that display and operates the graphical item chooser 116. The one or more web pages 108 may include HTML objects, script objects, Cascade Style Sheet (CSS) objects, image objects, as well as other static and dynamic objects (e.g., algorithms). These objects may be downloaded from the one or more servers 102 and assembled by the web browser 114 into the graphical item chooser 116. The operation of the graphical item chooser 116 may be further illustrated in FIGS. 2a and 2b.

Figure 2A:
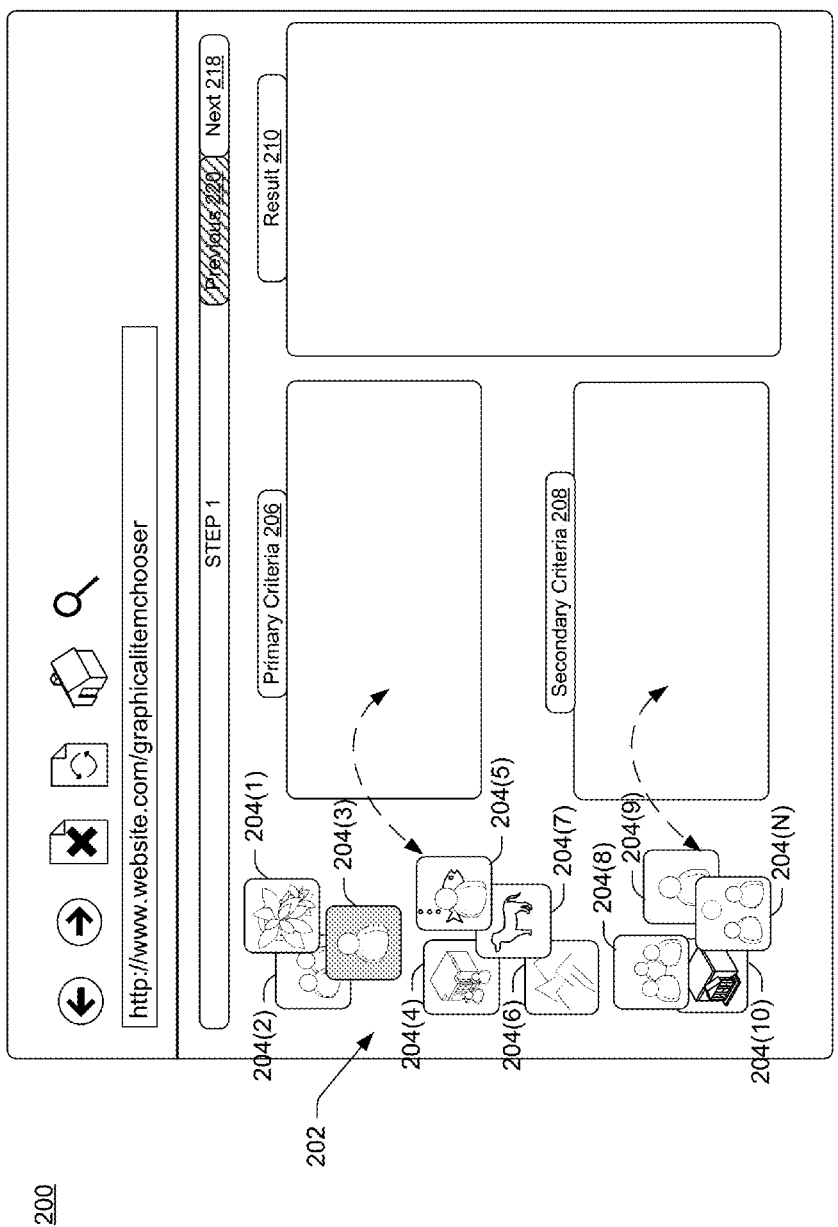
FIGS. 2a and 2b show an illustrative user interface screen of the graphical item chooser that enable objective-based sorting of products or services, in accordance with one or more embodiments.
Figure 2B:
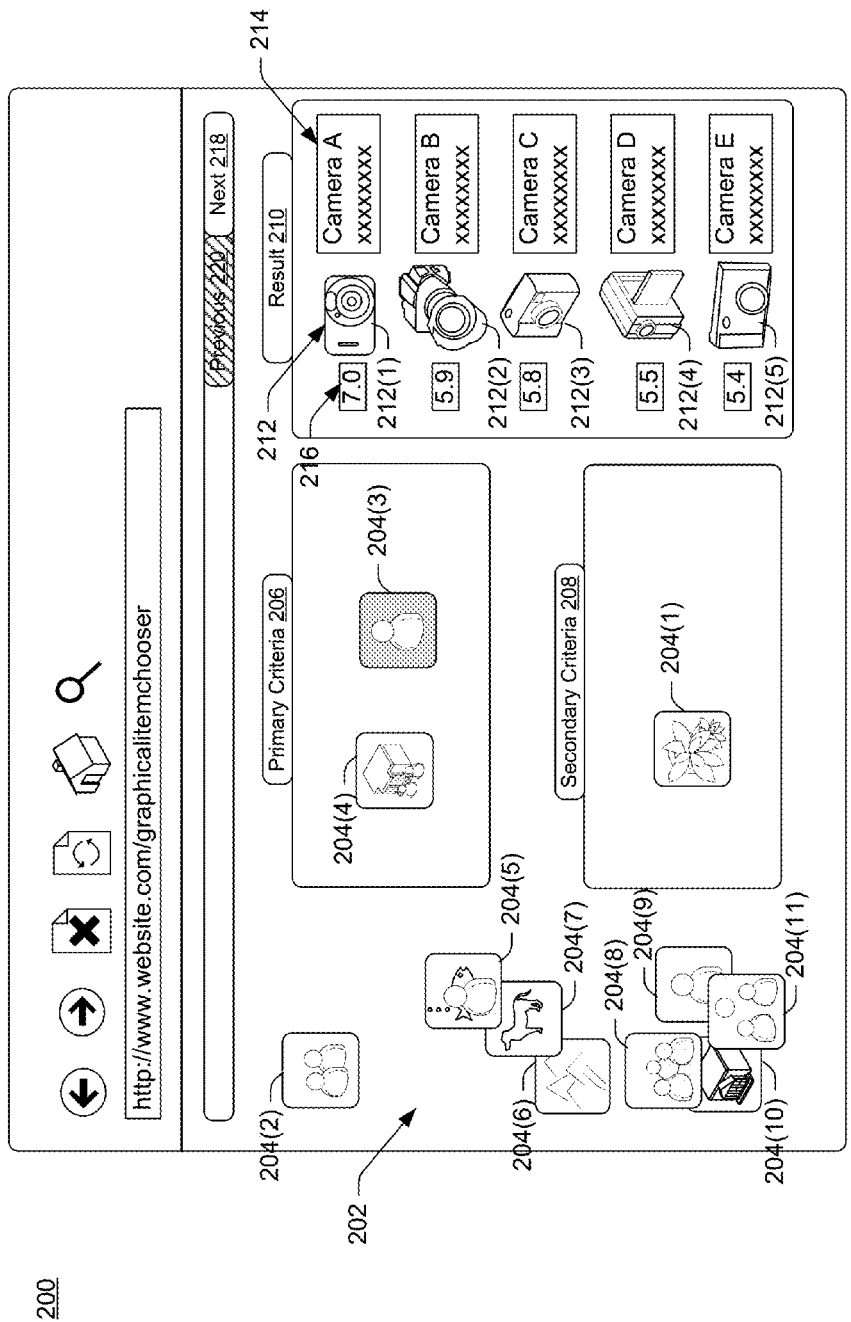

FIGS. 2a and 2b show an illustrative user interface screen 200 of the graphical item chooser that enable objective-based sorting of products or services, in accordance with one or more embodiments. The graphical item chooser 116 may be implemented by the web browser 114 (FIG. 1).

As shown in FIG. 2a, the graphical item chooser 116 may display a work area 202 in the user interface screen 200. In various embodiments, the work area 202 may include a plurality of objective icons 204(1)-204(N), a primary criteria selection portion 206, a secondary criteria selection portion 208, a results portion 210, navigation buttons 220-220.

Each of the object icons 204(1)-204(N) may represent an objective that a user desires from a product or services. In the context of a graphical item chooser 116 that assists a user in purchasing a digital camera, each of the objective icons 204(1)-204(2) may represent the intended objective for the desired camera that the user wishes to purchase. For example, icon 204(1) may represent taking close-up photos of objects, objective icon 204(2) may represent taking photos of family members, and objective icon 204(3) may represent taking night portraits. Likewise, objective icon 204(4) may represent taking travel photos, objective icon 204(5) may represent taking underwater photos, and objective icon 204(6) may represent taking photos of scenery, and so on and so forth.

In some embodiments, the objective icons 204(1)-204(N) may be positioned in a randomly stacked such that at least two of the objective icons 204(1)-204(N) overlap. This random stacking of the objective icons 204(1)-204(N) may produce a casual yet easy to view environment for the user. However, in other embodiments, the objective icons 204(1)-204(N) may be presented in a linear fashion (i.e., in one or more rows). In some of these embodiments, the one or more rows of objective icons 204(1)-204(N) may be presented linearly in a scrollable window with at least one scroll bar, in the event that the arrangement of the work area 202 is not able to simultaneous display all the objective icons 204(1)-204(N).

Additionally, each of the objectives represented by the objective icons 204(1)-204(N) may be associated with one or more product or service characteristics that facilitate the intended objective. For example, in the context of a camera chooser, the objective icon 204(1), which corresponds to the objective of taking close-up photos of objects, may be associated with camera characteristics such as having one or more of a macro lens, through-the-lens (TTL) metering, ring flash, external flash attachment, and/or the like. Likewise, objective icon 204(3), which corresponds to the objective of taking night portrait, may be associated with camera characteristics such as one or more of a manual shutter control, external flash attachment, wide-angle lens, full-frame sensor, and/or the like. As a further example, objective icon 204(4), which corresponds to taking travel photos, may be associated with camera characteristics such as one or more of compact size (e.g., capable of fitting into a shirt pocket), fast shutter speed, removable memory cards, water resistance, and/or the like.

In further embodiments, each of the objectives represented by the objective icons 204(1)-204(N) may also be associated with a combination of product or service characteristics that facilitate the intended objective. Thus, in another example involving objective icon 204(1) in the context of a camera chooser, objective icon 204(1) may be associated with a particular combination of a macro lens, through the lens (TTL) metering, ring flash, and external flash attachment. Likewise, objective icon 204(3) may be associated with a particular combination of a manual shutter control, external flash attachment, wide-angle lens, and full-frame sensor.

With the use of these embodiments, the user may use objective icons, such as the objective icons 204(1)-204(N), to select products or services that achieves the intended objective without necessarily having the knowledge, or having the resources or skills to acquire the knowledge, to achieving the intended objective. For example, in another context, the objective icons may be used to select an employee from a pool of employees to perform a project. In such an example, each of the objective icons may represent a specific task to be performed (e.g., managing a software development project, managing an advertising campaign, managing a tax audit, collect funds from clients, etc.). Moreover, each of the objective icons may be associated with the desired characteristics, such as ideal qualifications for each task. For example, the objective icon for managing a tax audit may be associated with one or more of a degree in accounting, a background in bookkeeping, certification in accounting, extensive amount of experience in dealing with government agencies, a license to practice law, etc.

In another example, the objective icons may be used to select a canine companion from various breeds. In such an example, each of the objective icons may represent a desired purpose for the canine companion (e.g., companionship, herding other animals, search and rescue, hunting, personal protection, etc.) Moreover, each of the objective icons may be associated with canine characteristics that are suitable for each purpose. For example, the objective icon for herding other animals may be associated with one or more characteristics such as relatively high intelligence, relatively strong physical strength and agility, relatively long endurance, acute hearing, easy to groom, etc.

Figure 3:
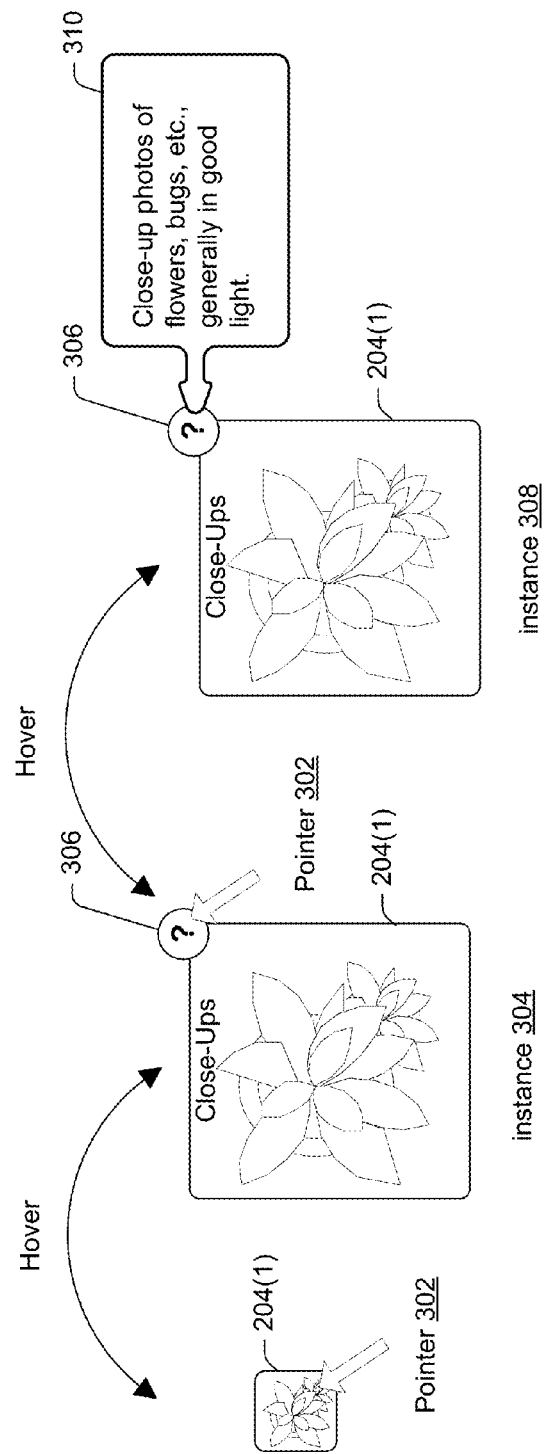
FIG. 3 shows illustrative behavior of a user interface icon of the graphical item chooser in response to user interaction, in accordance with one or more embodiments.

As shown in FIG. 3, in order to facilitate the use of the objective icons, such as the object icons 204(1)-204(N), the graphical item chooser 116 may provide additional details regarding each intended objective.

FIG. 3 shows illustrative behavior of the objective icon 204(1) of the graphical item chooser 116 in response to user interaction, in accordance with one or more embodiments. As shown, the illustrative behavior is presented in the context of camera purchase decision making. The objective icon 204(1) may expand as a user positions a pointer 302 over the objective icon. The pointer 302 may be part of a graphical user interface (GUI) that displays the web browser 114. The expansion of the objective icon 204(1) may be shown in instance 304. The expansion of the objective icon 204(1) may enable a user to more clearly view the objective icon, as well as present another navigation region 306 to the user. The user may allow the objective icon 204(1) to revert to its original size by removing the pointer 302 from the objective icon.

However, as shown in instances 304 and 308, if the user desires to activate the navigation region 306, the user may further position the pointer 302 on the region. The activation of the navigation region 306 may instantiate an information display 310 that provides additional written description of the objective icon 204(1). Once again, the user may allow the objective icon 204(1) to revert to its original size by removing the pointer 302 from the navigation region. In further embodiments, the graphical item chooser 116 may provide expansion of the objective icon 204(1) and/or additional information in response to other emphasis actions (e.g., single click of a mouse, double clicks of mouse, display screen taps, etc.).

Returning to FIG. 2a, each of the first and secondary criteria selection portions 206 and 208, respectively, may enable the user select and rank the one or more desired objectives for the product and service. Accordingly, the user may select each desired objective for the product or service by drag and drop one or more of the objective icons 204(1)-204(N) into the primary criteria selection portion 206 or the secondary criteria selection portion 208. For example, as shown in FIG. 2b, the user may drag and drop objective icons 204(3) and 204(4) into the primary criteria selection portion 206, and drag and drop the objective icon 204(1) into the secondary criteria selection portion 208.

In various embodiments, the one or more objectives (e.g., objective icons 204(3) and 204(4)) dragged and dropped into the primary criteria selection portion 206 may be weighted more heavily than any objectives (e.g., objective icon 204(1)) dragged and dropped into the secondary criteria selection portion 208. For example, the sort algorithm 120 of the graphical item chooser 116 may assigns each of the objectives in the primary criteria selection portion 206 a weight of "2×", and each of the objectives in the secondary criteria selection portion 208 a weight of "1×". In this way, the sort algorithm 120 may sort a plurality of candidate products or services based on the weights assigned to each objective, and present a list of sorted products or services that matches the weighted objectives in the result display portion 210. For example, in the context of camera purchase, the primary criteria selection portion 206 (e.g., weight of "2×") may be labeled as "I take a lot of images like this", and the secondary criteria selection portion 208 (e.g., weight of "1×") may be labeled as "I occasionally take images like this." Further, the graphical item chooser 116 may sort the candidate products or services, and present a list of sorted cameras 212(1)-212(6) in the result display portion 210.

However, the sort algorithm 120 may sort the plurality of candidate products or services even when the objective icons are only present in one of the primary criteria selection portion 206 or the secondary criteria selection portion 208. In other words, the graphical item chooser 116 may sort the candidate products or services without weighing the intended objectives.

In alternative embodiments, the selection of one or more objectives for an ideal product or service, as well as the assignment of different weights to the selected objectives, may be accomplished without the specific use of the primary and secondary criteria selection portions 206 and 208, respectively. For example, but not as limitation, such selection and assignment may be achieve via the use of checkboxes, radio buttons, questionnaires, and/or the like. The example use of checkboxes for selection and weight assignment of one or more objectives for an ideal product or service is illustrated in FIG. 4.

Figure 4:
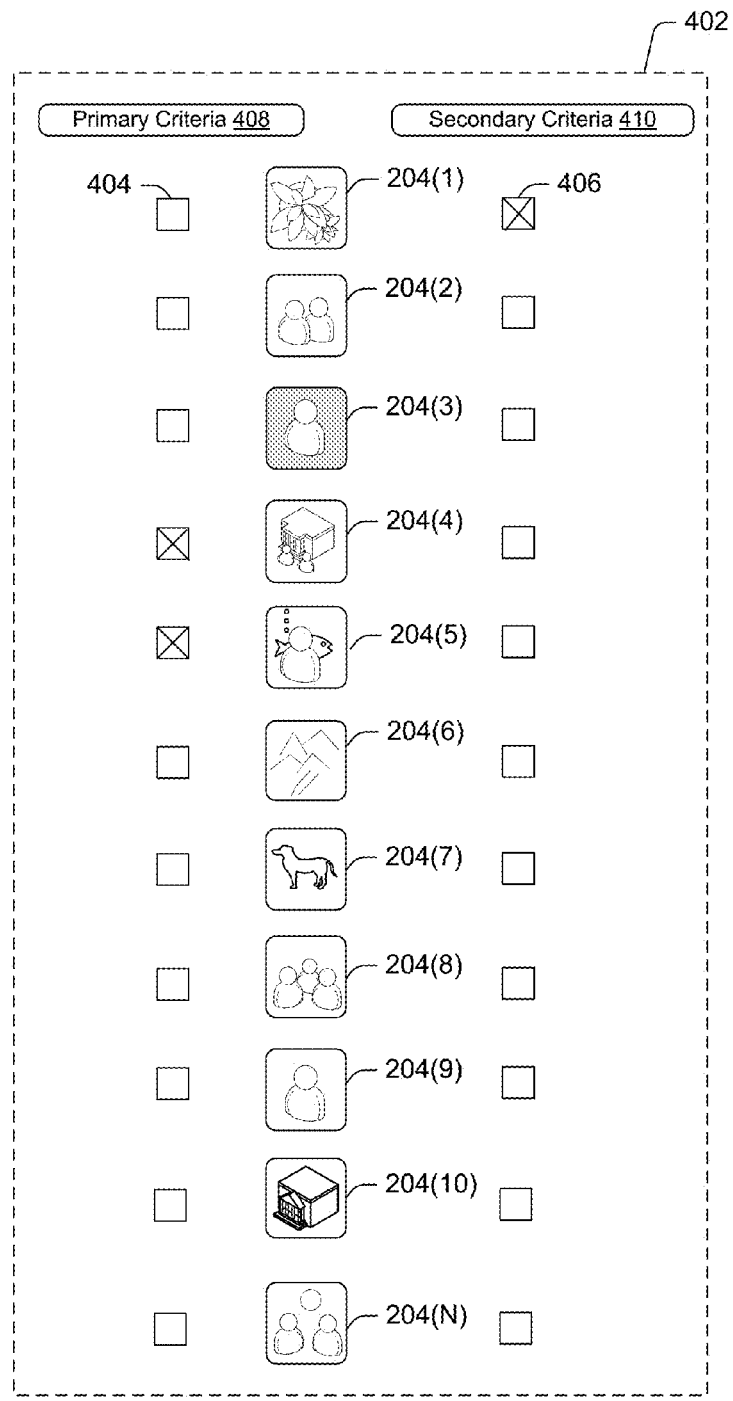
FIG. 4 shows the example use of checkboxes for the selection one or more objectives for an ideal product or service, as well as the assignment of different weights to the one or more selected objectives, in accordance with one or more embodiments.

FIG. 4 shows the example use of checkboxes for the selection one or more objectives for an ideal product or service, as well as the assignment of different weights to the selected objectives. In various embodiments, the checkbox selection portion 402 may include the objective icons 204(1)-204(N), each of the objective icons may be associated with two checkboxes. One of the two checkboxes (e.g., checkbox 404) for each objective icon (e.g., objective icon 204(1)) may be for selecting and designating the objective represented by the objective icon as a desired objective of a primary weight 408. Similarly, the other of the two checkbox (e.g., checkbox 406) may be for selecting and designating the presented by the objective icon (e.g., icon 204(1)) as a desired objective of a secondary weight 410. Thus, the checkbox selection portion 402, as shown in FIG. 4, may replicate the options given by the objective icons 204(1)-204(N), the primary criteria selection portion 206, and the secondary criteria selection portion 208, as shown in FIGS. 2a and 2b. Accordingly, the checkbox selection portion 402 may be a substitute for the randomly stack objective icons 204(1)-204(N) of the work area 202 shown in FIGS. 2a and 2b.

In addition, while the above figures illustrate that the techniques allow a user to select primary criteria and secondary criteria associated with an item, other embodiments may instead allow the user to only select one or more primary criteria. That is, the user may simply select how the user intends to use the item, rather than how they primarily and secondarily intends to use the item. In still other embodiments, the techniques may allow the user to rate the planned users with even more granularity that illustrated in FIGS. 2-4. For instance, a user may assign their own weight to the characteristic (e.g., on a scale of zero to ten). In such an instance, the user may rate a characteristic as zero (0) if the user never plans to use the item in that particular manner, while rating another characteristic as a ten (10) if the user almost always plans to use the item in that second manner. The user may then rate characteristics in between (e.g., 5.6, 2.3, 7, etc.) for uses that fall somewhere in between.

Returning to FIG. 2a, the sort algorithm 120 may calculate a suitability score for each of a plurality of candidate products or services based on multiple factors, and further sort the candidate products or services according to the suitability scores. The factors may include the one or more user inputted objectives for the product and services, as reflected in drag and drop selection of one or more objective icons from the objective icons 204(1)-204(N). As described above, each objective icon 204(1)-204(N) may be associated with characteristics of the products or services that facilitate the particular objective. Thus, by selecting an object icon into an objective criteria selection portion, the user essentially chooses the characteristics represented by the objective icon as desirable.

Accordingly, the sort algorithm 120 may ascertain the one or more most desirable characteristics of the product or service based on the frequency that each associated characteristic is chosen via one or more selected objective icons. For example, in the context of a camera graphical item chooser, the characteristic of "wide angle lens" may be chosen via the selection of 5 objective icons, and the characteristic of "zoom lens" may be chosen only once via the selection of a single objective icon. As a result, the sort algorithm 120 may heuristically determine that the characteristic of "wide angle lens" is more desirable to the user than the characteristic of "zoom lens."

The factors may further include the placement of the selected objective icons in the primary criteria selection portion 206 or the secondary criteria selection portion 208, which may determined the weight assigned to each selected objective. For example, in the context of a camera drop and chooser, the characteristic of a full-frame sensor may be chosen via the placement of an objective icon in the primary criteria selection portion 206. On the other hand, the characteristic of through-the-lens (TTL) metering may be chosen via the placement of an objective in the secondary criteria selection portion 208. Thus, the full-frame sensor characteristic may be weighed more heavily than the through-the-lens (TTL) metering characteristic.

The factors may also include one or more characteristics of each candidate product or service. In other words, the factors may also include the specification of each candidate product or service. For example, in the context of a camera graphical item chooser, the characteristics for each camera may include whether each camera has macro lens, through-the-lens (TTL) metering, ring flash, external flash attachment, manual shutter control, wide-angle lens, full-frame sensor, etc.

The factors may alternatively or additionally include review rating of each candidate product or service. In the example of the camera graphical item chooser, the review rating of each camera may be based on the perceived quality of the camera, the perceived usability of the camera, the perceived durability of the camera, the perceived aesthetics of the camera, and/or the like. Thus, the sort algorithm 120 may evaluate the suitability of each candidate product or service for achieving the desired objectives based on these factors, and generate a sort list of the products or services according to suitability.

Thus, by using one or more of these factors, the sort algorithm 120 may sort the plurality of candidate products or services based at least on similarities between one or more characteristics of each candidate product or service and the one or more most desired characteristics. In various embodiments, the more closely the characteristics of a particular candidate product or service match the one or more most desirable characteristics of the ideal product or service, the more suitable the particular product or service is determined to be. In some embodiments, the determined suitability of each product or service may also influence by the review rating of the product or service. For example, in an instance where two products or service are substantially equal in suitability for achieve the one or more desired objectives, the product or service with the higher review rating may be deemed more suitable.

As shown in FIG. 2b, the graphical item chooser 116 may display the sorted products or services in a display portion 210. In some embodiments, the graphical item chooser 116 may display the sorted products or services according to a descending order based on their suitability for achieving the one or more desired objective, that is, from the most suitable to the least suitable. However, in other embodiments, the sorted products or services may also be displayed from the least suitable to the most suitable. In the event that the result display portion 210 is not able to simultaneous display all the sorted products or services, the result display portion 210 may display a scroll bar for displaying additional results. In other embodiments, the result display portion 210 may display a partial list, i.e., a predetermined number of candidate products or services that have been sorted according to the criteria 206 and 208.

In various embodiments, the result display portion 210 may display each of the sorted candidate products or services via a pictorial representation (e.g., picture 212), and/or via a written description (e.g., written description 214). The written description may include information such as the manufacturer, service provider, style, model, features, and/or highlights of the particular product or service. In some embodiments, the result display portion 210 may further display the suitability score (e.g., score 216) for each of the sorted product or service. The score may represent on a numerical scale (e.g., 1-10), the suitability of the product or service for achieving the desired objective, as calculated and sorted by the sort algorithm 120.

While the sort algorithm 120 is illustrated in FIGS. 2a and 2b as performing sort operations based on two weighted groups of criteria, the sort algorithm 120 may use any plurality of weighting groups to assign more different levels of significance (e.g., 1×, 2×, 3×, etc.). Thus, the graphical item chooser 116 may include other criteria selection portions in addition to the criteria selection portions 206-208.

In at least one embodiment, the graphical item chooser 116 may use the sort algorithm 120 to dynamically sort the candidate products or services. Such dynamic sorting may take place in response to any addition or removal of one or more of the objective icons 204(1)-204(N) to or from the primary criteria selection portion 206 and/or the secondary criteria selection portion 208. Thus, the candidate products or services displayed in the result display portion 210 may also dynamically change in response to the addition or removal of the one or more of the objective icons.

Moreover, when there is an insufficient number of objective icons placed in the primary criteria selection portion 206 and/or the secondary criteria selection area 208 for the sort algorithm 120 to generate a list of sorted products or services, the result display portion 210 may display an information message. The information message may indicate to the user that one or more of the objective icons 204(1)-204(N) are to be placed in at least one of the selection portions. For example, in the context of cameras, the information message may state, "Please select at least two images to see some results."

The navigation button 218 of the graphical item chooser 116 may enable the user to navigate to the next option of the graphical item chooser 116. Likewise, the navigation button 220 may enable the user to navigation to the previous option of the graphical item chooser 116. However, as shown in FIGS. 2a and 2b, the navigation button 220 may be inoperable if there are no previous options. In some embodiments, the graphical item chooser 116 may enable the user to skip the weighted objective criteria selection operation shown in FIGS. 2a and 2b via the navigation 218. In this way, the user may proceed directly to the binary feature selection operations illustrated in FIGS. 5a and 5b, as described below.

Figure 5A:
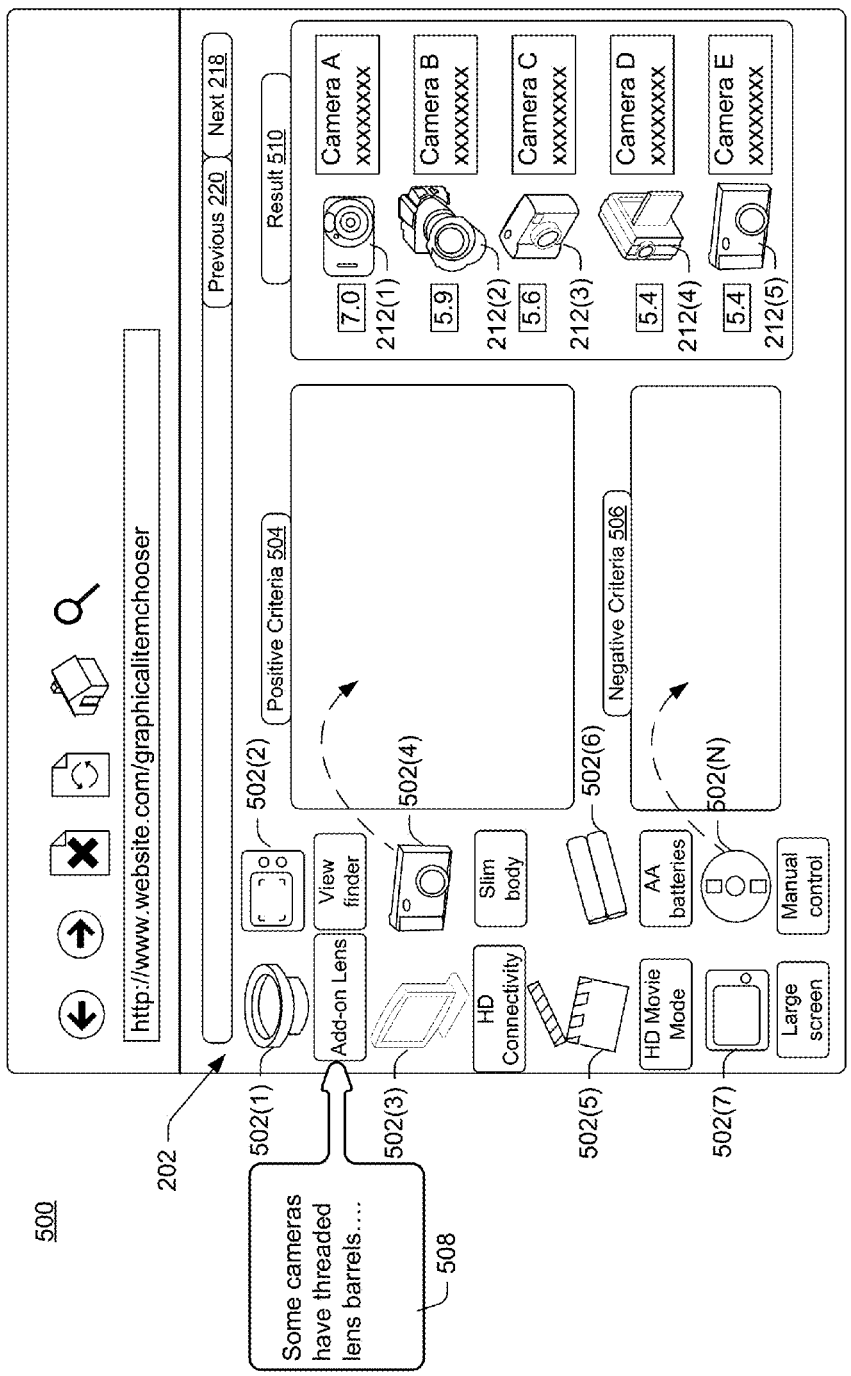
FIGS. 5a and 5b show an illustrative user interface screen of the graphical item chooser that enables the binary selection of desired features for a product or service, in accordance with one or more embodiments.
Figure 5B:
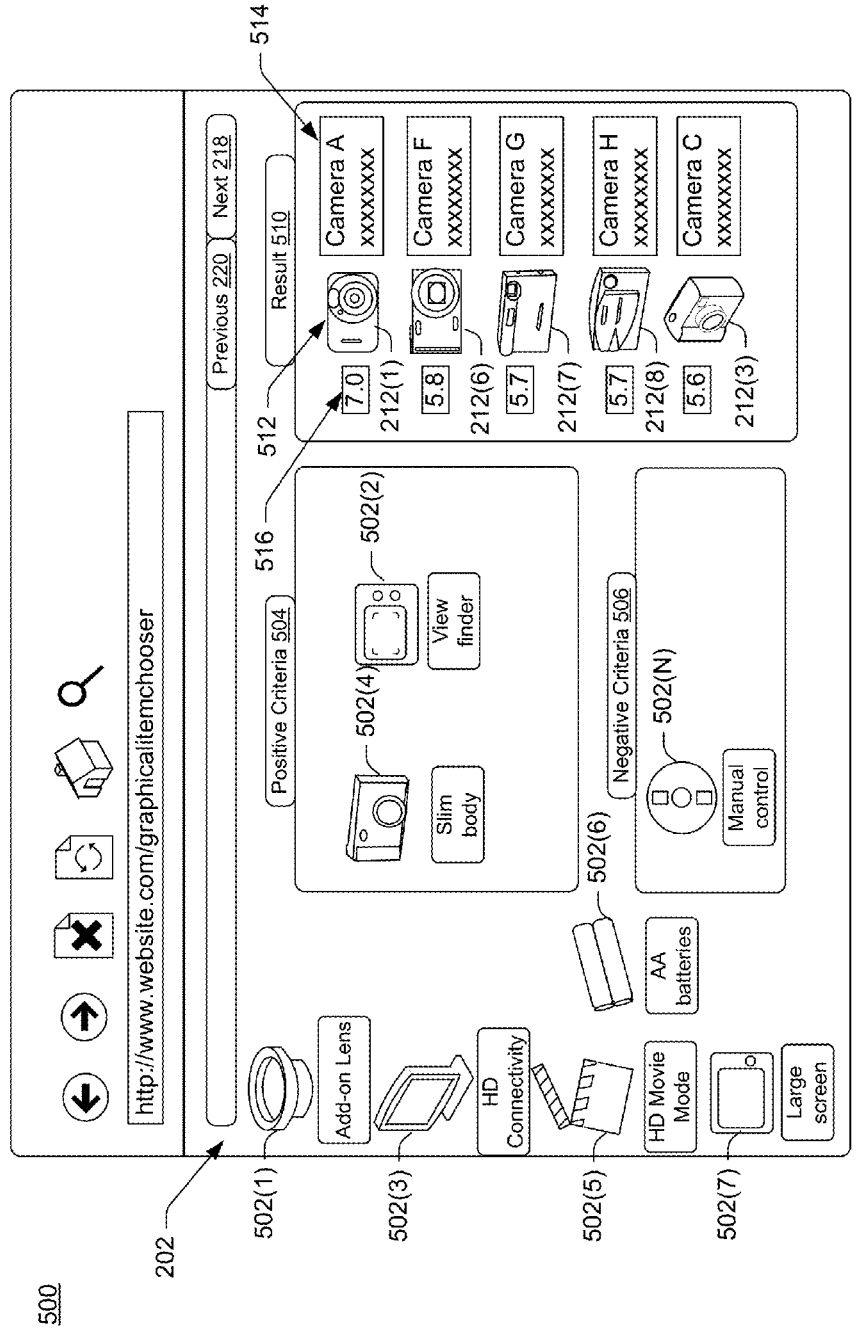

FIGS. 5a and 5b show an illustrative user interface screen 500 of the graphical item chooser 116 that enable the binary selection of desired features for a product or service, in accordance with one or more embodiments. The graphical item chooser 116 may be implemented by the web browser 114. As described above, the user may perform the binary selection following the weighted criteria selection by using the navigation button 218.

As shown in FIG. 5a, the graphical item chooser 116 may display a work area 202 in the user interface screen 500. In various embodiments, the work area 202 may display a plurality of feature icons 502(1)-502(N), a positive criteria selection portion 504, a negative criteria selection portion 504, result display portion 510, as well as navigation buttons 218-220.

Each of the feature icons 502(1)-502(N) may represent a particular feature of an ideal product or service that the user desires. In the context of a graphical item chooser 116 that assists a user in purchasing a digital camera, each of the feature icons 502(1)-502(N) may represent a feature of the ideal camera. For example, feature icon 502(1) may represent the ability of a camera to accept an add-on lens, feature icon 502(2) may represent a physical view finder; feature icon 502(3) may represent high-definition (HD) connectivity, feature icon 502(4) represents a slim body (e.g., less than 1 inch thick), and so on and forth.

However, in the example of a graphical item chooser 116 that assists a user in selecting an employee to perform a task, the feature icons 502(1)-502(7) may represent attributes of an ideal employee (e.g., available on call, willing to relocate, available for night shift, willing to travel, available for weekdays, available for weekends, and/or the like).

Further, in the example of a graphical item chooser 116 that assists a user in selecting a canine companion, the feature icons 502(1)-502(7) may represent attributes of an ideal companion pet (e.g., short coat, long coat, minimal shedding, good with children, small size, large size, and/or the like).

In various embodiments, the feature icons 502(1)-502(N) may be presented in a linear fashion (i.e., in one or more rows). In some of these embodiments, the one or more rows of icons 502(1)-502(N) may be presented linearly in a scrollable window with at least one scroll bar, in the event that the work area 202 is not able to simultaneous display all the icons 502(1)-502(N). However, in other embodiments, the features icons 502(1)-502(N) may be presented in a randomly stacked fashion in the same manner as the objective icons 204(1)-204(N) described above. In some embodiments, each of the feature icons 502(1)-502(N) may present additional details (e.g., additional details 508) in response to the positioning of a pointer (e.g., pointer 302) over the icon, similar to the operation of the objective icons 204(1)-204(N) described in FIG. 3.

As shown in FIG. 5b, the user may select one or more desired features by dragging and dropping one or more of the corresponding feature icons 502(1)-502(N) into the positive criteria selection portion 504. For example, in the context of camera purchasing, the user may drag and drop icons 502(2) and 502(4) into the positive criteria selection portion 504 to select a camera with a slim body and a physical view finder. Thus, in such an example, the positive criteria selection portion 504 may be labeled as "I would like these features."

The user may also exclude or more undesirable features by dragging and dropping one or more of the corresponding feature icons 502(1)-502(N) into the negative criteria selection portion 504. For example, in the context of camera purchasing, the user may drag and drop icon 502(N) into the negative criteria selection portion 504 to exclude a camera with manual control. Thus, in such an example, the negative criteria selection portion may be labeled as "exclude cameras with these features." Nevertheless, it will be appreciated that the positive selection portion 504 and the negative criteria selection portion 504, may be implemented in other ways (e.g., via checkboxes, radio buttons, questionnaires, etc.), in the same manner as described with respect to the primary and secondary criteria selection portions 206 and 208 in FIGS. 2a and 2b.

In various embodiments, the sort algorithm 120 may dynamically rearrange the list of products or services previously displayed in the result display section 510 based on the one or more of the feature icons 502(1)-502(N) in the positive criteria selection portion 504 and/or the negative selection criteria selection portion 506.

Specifically, the sort algorithm 120 may exclude any previously displayed product or service that does not include a feature represented by at least one feature icon in the positive criteria selection portion 504. For example, in the context of camera purchasing, the sort algorithm 120 may exclude camera 212(2) as a candidate camera that is displayed the result display portion 510 because camera 212(2) does not have a slim body (e.g., less than 1 inch thick), as specified by the feature icon 502(4). Likewise, the algorithm 110 may exclude camera 212(4) as a candidate camera that is displayed in the result display portion 510 because camera 212(4) does not have a view finder, as specified by the feature icon 502(2).

Further, the sort algorithm 120 may also exclude any previously displayed product or service that includes a feature represented by at least one feature icon placed in the negative criteria selection portion 506. In another example in the context of camera purchasing, the sort algorithm 120 may exclude camera 212(5) as a candidate camera that is displayed in the result display portion 510 because camera 212(5) includes manual control, as specified by the feature icon 502(N). In various embodiments, the sort algorithm 120 may also dynamically exclude or restore products or services based on changes to positive and negative criteria selection portions 504 and 506, respectively. For example, the sort algorithm 120 may determine that one or more feature icons have been removed from the positive criteria selection portion 504 and/or the negative criteria selection portion 506. As a result, the sort algorithm 120 may restore the affected product or service back into the list of products or services for display. In some embodiments, the exclusion of product or services from being displayed in the result display portion 510 may enable the display of one or more additional products or services by the sort algorithm 120. For example, in the context of camera purchasing, cameras 212(6)-216(8), which have not been previously displayed, may be displayed due to the exclusion of cameras 212(2) and 212(4)-212(5).

Moreover, in at least one embodiment, the sort algorithm 120 may also recalculate the suitability of the products or services based on the one or more features 502(1)-502(N) placed in the positive criteria selection portion 504 and/or the negative criteria selection portion 506. For example, in the context of camera purchasing, cameras 216(6)-212(8) may have bodies that are less thick than the body of the camera 212(3). Thus, as the sort algorithm 120 accounts for the placement of the feature icon 502(3) in the positive criteria selection portion 504, the sort algorithm 120 may adjust the scores for the cameras 212(6)-212(8) and move them ahead of camera 212(3) in the result display portion 510 as being more suitable. For example, the sort algorithm 120 may multiple the score of each of the cameras 212(6)-218(8) by a positive weight factor (e.g., 1.2) for each feature it possesses that has been placed in the positive criteria selection portion 504 via a corresponding feature icon.

In other embodiments, rather than excluding each product or service that includes a feature that has been placed in the negative criteria selection portion 506, the sort algorithm may multiple the score of each previously product or service by a negative weight factor. (e.g., 0.8). The negative weight factor may be assigned to each product or service for each feature that the product or service possesses that is represented by a feature icon in the negative criteria selection portion 506. For example, the sort algorithm 120 may multiply the score of the camera 212(2), or the score of 5.9 by the negative weight factor 0.8, resulting in a new score of 4.6 for the camera 212(2). The score of 4.6 may cause the camera 212(2) to drop lower than the camera 212(5). As shown in FIG. 5b, this drop in score may cause camera 212(2) to disappear from the result display portion 510. Nevertheless, such redistribution and weighting may also be dynamically reversed when the sort algorithm 120 determines that one or more feature icons have been removed from the positive criteria selection portion 504 and/or the negative criteria selection portion 506. In embodiments where the user has bypassed the weighted objective criteria selection shown in the FIGS. 2a and 2b, the graphical item chooser 116 may operate in a different manner. In such embodiments, the graphical item chooser 116 may exclude one or more candidate products or services based on the placement of at least one feature icon in the positive criteria selection portion 504 and/or the negative criteria selection portion 506. Once the exclusion is complete, the graphical item chooser 116 may display the remaining candidate products or services in the result display portion 510. In some embodiments, the graphical item chooser 116 may present the remaining candidate products or service as a list that is sorted according to the review rating score (e.g., score 516) for each product or service (e.g., the highest rated to the lowest rated, or vice versa). Once again, in various embodiments, the sort algorithm 120 may detect that one or more feature icons have been removed from or restored to the positive criteria selection portion 504 and/or the negative criteria selection portion 506. As a result, the sort algorithm 120 may dynamically restore each affected product or service back into the list of products or services for display.

In alternatives of such embodiments, rather than excluding candidate products or services, the sort algorithm 120 may multiple the review rating score of each product or service by one or more positive weight factors or one or more negative weight factors. The positive weighting or negative weighting may be implemented based on the placement of corresponding feature icons in the positive criteria selection portion 504 or the negative criteria selection portion 506. The candidate products or services may be further sorted for display based on the weighted review rating scores.

However, when there are an insufficient number of features icons placed in the positive criteria selection portion 504 and/or the negative criteria selection portion 506 to display a list of suitable products or services, the result display portion 510 may display an information message. The information message may indicate to the user that one or more of the feature icons 502(1)-502(N) are to be placed in at least one of the selection portions. For example, in the context of cameras, the information message may state, "Please select at least one feature to see some results."

As shown in FIG. 5b, the result display portion 510 may once again display each of the products or services via a pictorial representation (e.g., picture 512), and/or via a written description (e.g., written description 514). The written description may include information such as the manufacturer, service provider, style, model, features, and/or highlights of the particular product or service. In some embodiments, the result display portion 510 may further display the suitability score or review rating (e.g., score 516) for each of the sorted product or service.

Once again, the navigation button 218 of the graphical item chooser 116 may enable the user to navigate to the next option of the graphical item chooser 116. Likewise, the navigation button 220 may enable the user to navigate to the previous option of the graphical item chooser 116. Thus, by using the navigation buttons, the user may proceed to a result customization operation illustrated in FIGS. 5a and 5b, as described below. In some embodiments, the graphical item chooser 116 may enable a user to skip the binary selection operation described in FIGS. 5a and 5b.

It will be appreciated that in other embodiments, the binary selection of the positive features and negative features for a product or service may be accomplished with variable rating and selection. In such embodiments, the positive criteria selection portion 504 and the negative selection portion 506 shown in FIGS. 5a and 5b may be replaced with a gradual rating and selection interface. For example, but not as a limitation, each of the feature icons 502(1)-502(N) in the work area 202 may be provided with a slider bar that enable a user to rate the desirability of each feature from a scale of 1-10, with '1" being the lowest desirability rating and "10" being the highest desirability rating. In another non-limiting example, each of the feature icons 502(1)-502(N) may be provided with a set of five selectable stars, in which the user may select more stars for more desirability features, and less stars for less desirable features. The sort algorithm 120 may be configured to force the user to rate all the features, such as represented by the feature icons 502(1)-502(N). Alternatively, the sort algorithm 120 may allow the user to provide ratings for only some of the features (e.g., a predetermined minimal number or predetermined minimal percentage of the total features).

In some embodiments, the sort algorithm 120 may perform binary selection of the features by treating a predetermined number or percentage of the lowest rated features as undesirable (e.g., negatively selected). Likewise, the sort algorithm 120 may also treat a predetermined number or percentage of the highest rated features as desirable (e.g. positive selected). For example, but not as a limitation, in an instance where the user has rated a total of six features, the sort algorithm 102 may treat the three highest rated features as being positively selected, i.e., desirable, while treating the three lowest rated feature as being negatively selected, i.e., undesirable. However, in instances where the number of rated features is below a number threshold, the rated features may be treated as positively selected regardless of the ratings, with no features being treated as negatively selected.

In other embodiments, rather than providing each of the feature icons 502(1)-502(N) with its individual variable rating interface (e.g., slider bar, selectable stars, etc), the work area 202 may include a drag and drop variable rating portion that is similar in appearance to one of the selection portions 504-506. In such embodiments, the sort algorithm 120 may enable the user to rate one or more features by the relative positioning of their corresponding feature icons in the drag and drop variable rating portion. For example, but not a limitation, the sort algorithm 120 may interpret the desirability of each feature based on proximity of each corresponding feature icon to a left side of the drag and drop variable rating portion. Put it another way, the sort algorithm 120 may enable a user may to line up feature icons from left to right according to the desirability of each corresponding feature. In other examples, the sort algorithm 120 may also enable a user to rate desirability by other positioning techniques (right to left, top to bottom, etc.). Accordingly, the drag and drop variable portion may be accompanied by the appropriate instructions regarding the positioning of the feature icons.

In further embodiments, the sort algorithm 120 may also use the rating received by each of the one or more features to rank products or services, rather than implement binary selection. In at least one embodiment, the rating received by each product or service may be used by the sort algorithm 120 as weight factors (e.g., ratings of 1-10) for the adjustment of the suitability scores of the products or services.

Figure 6A:
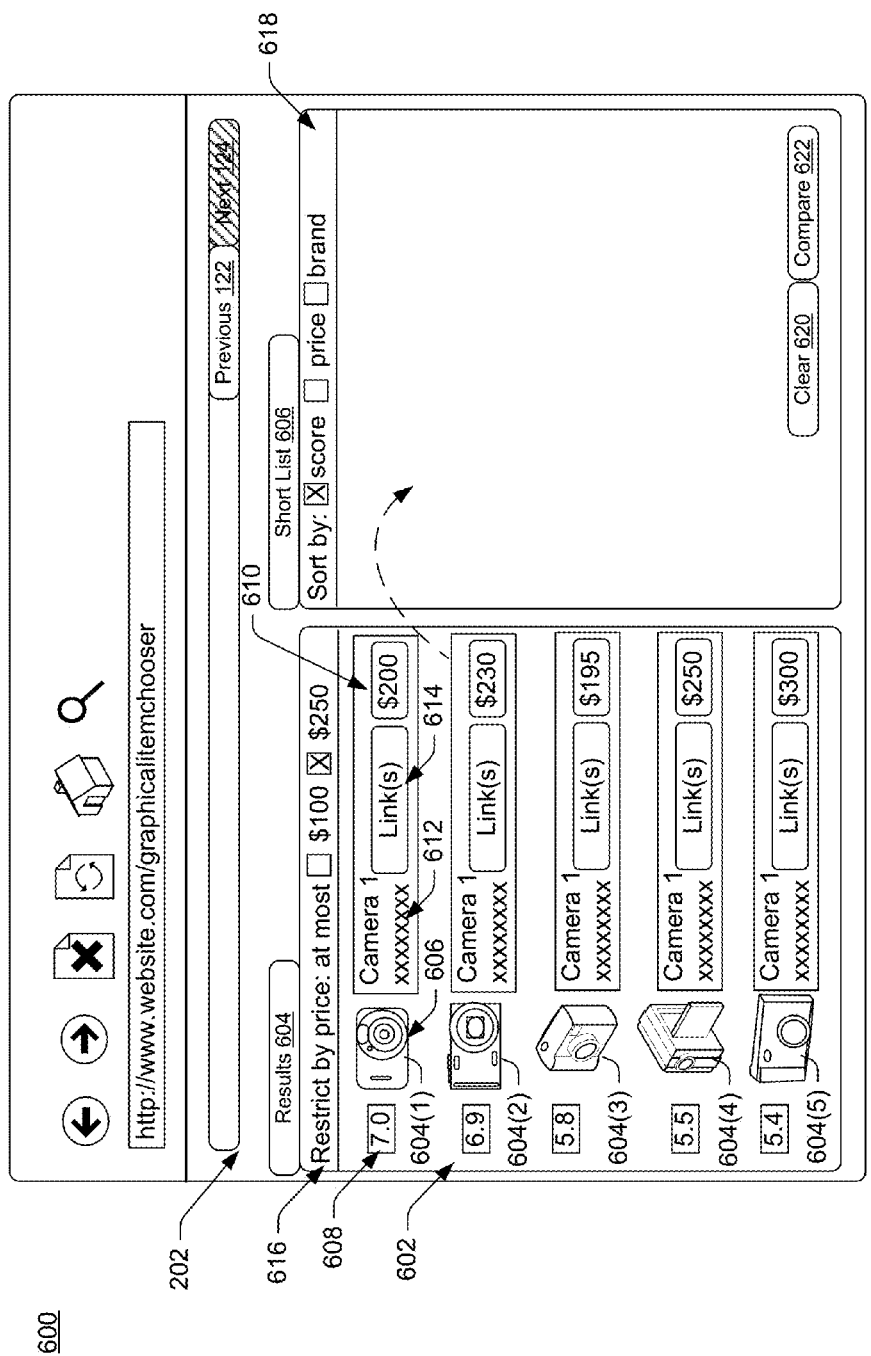
Figure 6B:
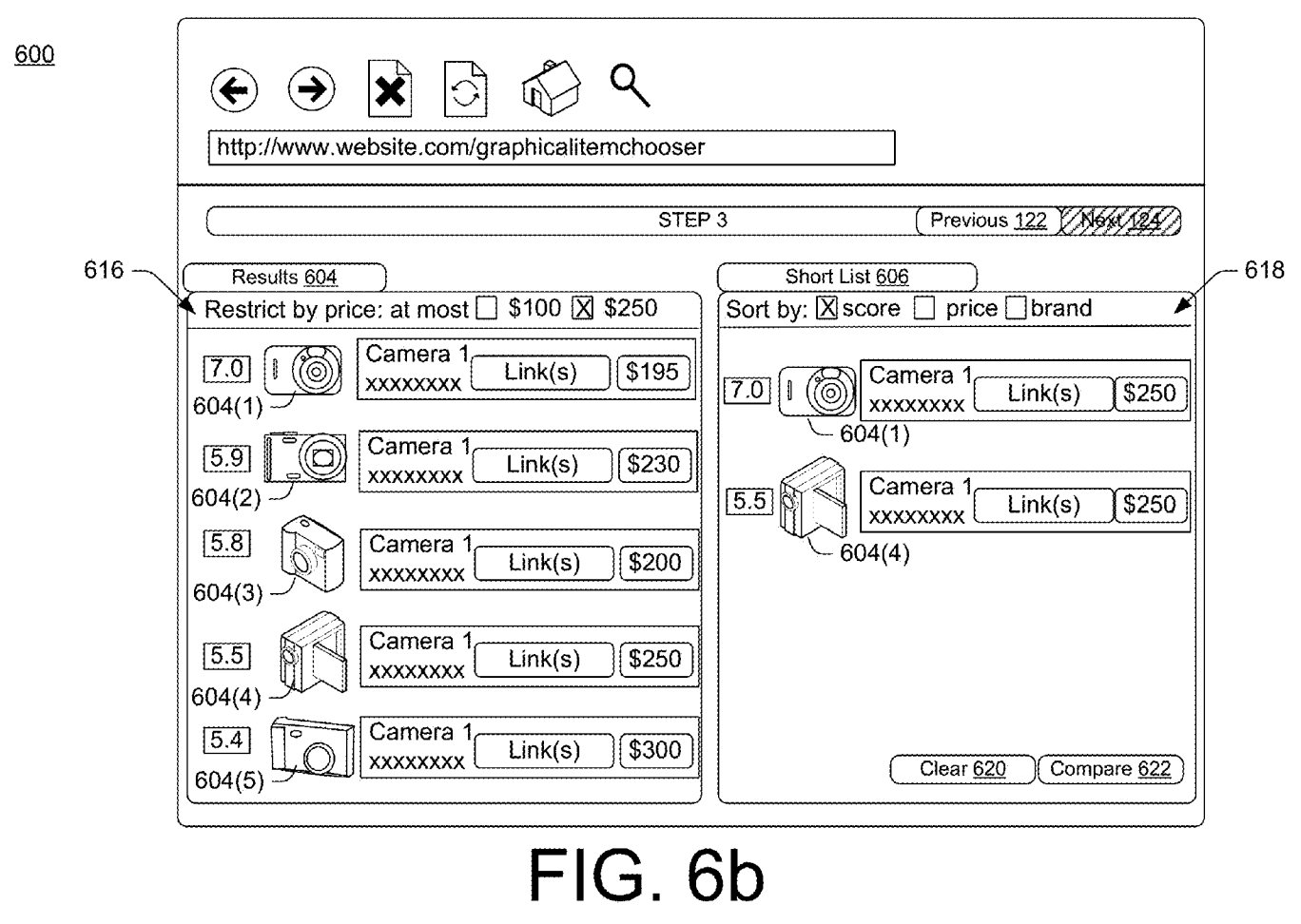

FIGS. 6a and 6b show an illustrative user interface screen 600 of the graphical item chooser 116 that enables customization of the product or service recommendations, in accordance with one or more embodiments. The product or service recommendations may be in the form of a sorted recommendation list 602 that is displayed in a result display portion 604 in the work area 202. The sorted recommendation list 602 may be obtained via the weighted objective selection operation described in FIGS. 2a and 2b, and/or the binary selection operation described in FIGS. 5a and 5b. In the context of cameras, the sorted recommendation list 602 may include a list of cameras 604(1)-604(5). Each entry in the sorted recommendation list 602 may include a pictorial representation of a particular product or service (e.g., thumbnail 606), a suitability score (e.g., suitability score 608), a price for the particular product or service (e.g., price 610), a written description (e.g., description 612), and one or more hyperlinks for the product or services (e.g., link(s) 614).

The price (e.g., price 610) of the product or service in each entry may be obtained from the one or more servers 102 and stored on the electronic device 104. In some embodiments, the price for each entry may be simultaneously downloaded with the graphical item chooser 116. In other embodiments, the graphical item chooser 116 may periodically query the one or more servers 102 at a predetermined interval to obtain the most update-to-date price. The graphical item chooser 116 may also instantiate a price display that provides links to retailer so that the user may purchase the one or more products or services displayed in the sorted recommendation list 602. An example price display is illustrated in FIG. 7.

Figure 7:
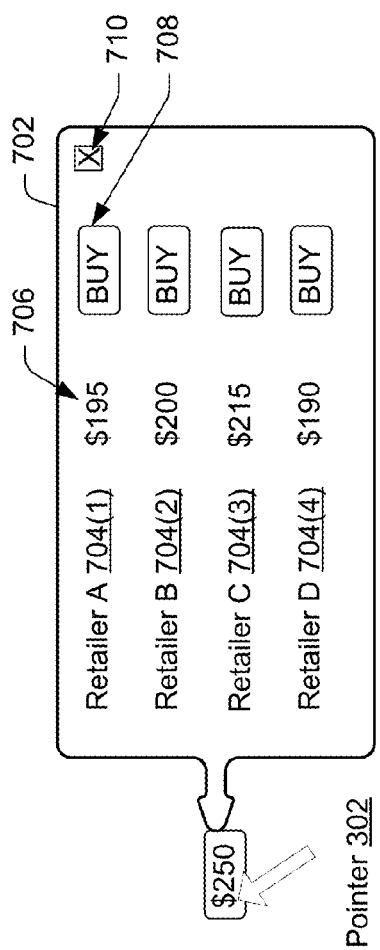
FIG. 7 shows an example price display that is instantiated when a user selects a price that is displayed as part of the sorted recommendation list, in accordance with one or more embodiments.

FIG. 7 shows an example price display 702 that is instantiated when a user positions a pointer (e.g., pointer 302) over a price (e.g., price 610) that is displayed as part of the sorted recommendation list 602. Nevertheless, it will be appreciated that in other embodiments, the price display 702 may be instantiated in response to other actions, such as one or more clicks, one or more swipes, etc., over the price (e.g., price 610).

As shown, the price display 702 may include a list of retailers 704(1)-704(4). The price charged by each of the retailers, and as well as links to the merchant website of each retailer, may also be displayed in the price display 702. For example, the price display 702 may show that the price 706 that the retailer A 704(1) charges for a particular product or service is $195. The price display 702 may also include a hyperlink 708 that navigates the user to a merchant website of the retailer A 704(1) so that the user may purchase the product or service. In some embodiments, the user may dismiss the price display 702, i.e., make it disappear by positioning the pointer away from the corresponding price (e.g., price 610). In other embodiments, the user may use the button 720 to dismiss the price display 702.

Thus, returning to FIG. 6a, the price displayed in each product or service entry of the sorted recommendation list 602 may be the average price, the median price, the highest price, or the lowest price that is derived from the prices charged by the different retailers (e.g., retailers 704(1)-704(4)).

As further shown in FIG. 6a, the written description (e.g., description 612) for each product or service entry of the sorted recommendation list 602 may include information such as the manufacturer, service provider, style, model, features, and/or highlights of the particular product or service. Further, the one or more links (e.g., link(s) 614) for each product or service entry of the sorted recommendation list 602 may include a hyperlink to a website that includes a product or service review for the particular product or service, and/or a website that provide more details regarding the product or service.

The sorted recommendation list 602 may include a filter selection menu 616. The filter section portion 604 may enable a user to refine the sorted recommendation list 602. In turn, the graphical item chooser 116 may use the sort algorithm 120 to filter the sorted recommendation list 602 based on user input into the filter selection menu 616. In various embodiments, the filter selection menu 616 may enable the user to exclude products or services that are above a certain price limit. In at least one embodiment, the filter selection menu 616 may include a plurality of selectable price limits (e.g., price limits having checkboxes, radio buttons, or the like.) In reference to FIG. 6a, when the user selects $250 as the maximum price using a corresponding checkbox, the graphical item chooser 116 may remove camera 604(5) from the sorted recommendation list 602 that are priced (e.g., median price, mean price) beyond the maximum price.

In other embodiments, the filter selection menu 616 may enable the user to refine the sorted recommendation list via other criteria, such as by manufacturer, by service provider, by the suitability score (e.g., exclude product or service that are below a predetermined suitability threshold), and/or the like.

The work area 202 shown in FIG. 6a may further include a short list portion 606. In various embodiments, the graphical item chooser 116 may enable a user to drag and drop one or more products or services from the sorted recommendation list 602 to the short list portion 606 for further consideration. FIG. 6b shows the operation of the short list portion 606 in the context of cameras. In the example shown, the user may drag and drop, or otherwise place cameras 604(1) and 601(4) into the short list portion 606. The placement of a product or service in the short list portion 606 also moves the associated pictorial representation (e.g., thumbnail 606), the suitability score (e.g., suitability score 608), the price (e.g., price 610), the written description (e.g., description 612), and the one or more hyperlinks for the product or services (e.g., link(s) 614) into the short list portion 606.

In at least one embodiment, the short list 606 may include a filter selection menu 618. The filter selection menu 618 may include checkboxes, radio button, and or the like that provides user preferences to the sort algorithm 120. In turn, the sort algorithm 120 may further sort the products or services in the short list portion 606 according to one or more criteria. The one or more criteria include sort by manufacturer, service provider, suitability score, price, and the like.

As additionally shown in FIG. 6b, the short list 606 may include a selectable interface portion 620 (e.g., a clickable button) that enables the user to clear the contents of the short list 606 so that new content may be placed in the short list 606. In some embodiments, the short list 606 may include a selectable interface portion 622 (e.g., a clickable button) that, when selected, brings up a document, such as a webpage, that shows a side-by-side comparison of the products or services, such as cameras 604(1) and 604(4), the that were placed in the short list 606. For example, but not as a limitation, the side-by-side comparison document may compare the at least one of features, prices, advantages, disadvantages, and/or the like, of the products or services. In some embodiments, the result display portion 604 may also include a selectable portion that performs the same function as the selectable interface portion 622.

It will be appreciated that while the graphical item chooser 116 may be implemented as one or more web pages 108 in the web browser 114, the graphical item chooser 116 may also be implemented as a standalone application that runs on the electronic device 104. In such embodiments, the graphical item chooser may obtain data from the one or more servers 102 without the use of a web browser framework.

In additional embodiments, the graphical item chooser 116 may be implemented as a "thin client" such that the sorting of, as well as the generating of lists of recommended products or services, are performed on the one or more servers 102. In such embodiments, the graphical item chooser 116 may not perform any sorting and list generation operations on its own. Rather, the graphical item chooser 116 may simply pass data to the one or more servers 102 to be processed. For example, the graphical item chooser 116 may pass the data via the common gateway interface (CGI) protocol, the active server pages (ASP) protocol, asynchronous JavaScript and XML (AJAX), and/or the like.

Thus, returning to FIG. 1, at least one of the servers 102 may include one or more processors 122 and a storage media 124, which includes an operating system 126, as well as other modules. The modules may include routines, programs, objects, components, and data structures that cause the server 102 to perform particular tasks. The modules may include a sort algorithm 128, a search engine 130, data storage 130, and a data interface 132.

The operating system 126 may perform various function that enables the server 102 to receive data via various inputs (e.g., user controls, network interfaces, memory devices), process the data using the one or more processors 108 to generate output, and present the output (e.g., display the data on an electronic display, store the data in memory, or transmit the data to another electronic device). Accordingly, the operating system 126 may include various program components for performing such tasks.

The sort algorithm 128 may perform substantially the same functions as the sort algorithm 120. In various embodiments, the sort algorithm 128 may receive user selections with respect to the desired objectives for an ideal product or service, the features of an ideal product or service, filtering and display selections. In turn, the sort algorithm 128 may provide one or more lists of products or services sorted according to suitability and/or user filter and display selections.

The search engine 130 may perform searches related to the prices of the plurality of candidate products or services known to the graphical item chooser 116. In various embodiments, the search engine 130 may check various retailer websites for current prices. The search engine 130 may perform such searches at predetermined intervals to obtain the most up-to-date price.

The data storage 132 may perform substantially the same functions as the data cache 122. In various embodiments, the data storage 132 may stores data used by the sort algorithm 128. As further described below, such data may include, but not limited to, review rating data, hyperlink data, characteristics and/or features of various products or services, as well as other data used by the sort algorithm 128.

The data interface 134 may pass the user selections with respect to the desired objectives for an ideal product or service, the features of an ideal product or service, filtering and display selections to the sort algorithm 128. Moreover, the data interface may also provide one or more lists of products or services sorted according to suitability and/or user filter and display selections to a "thin client" graphical item chooser 116 for display to the user.

Illustrative Operations

Figure 8:
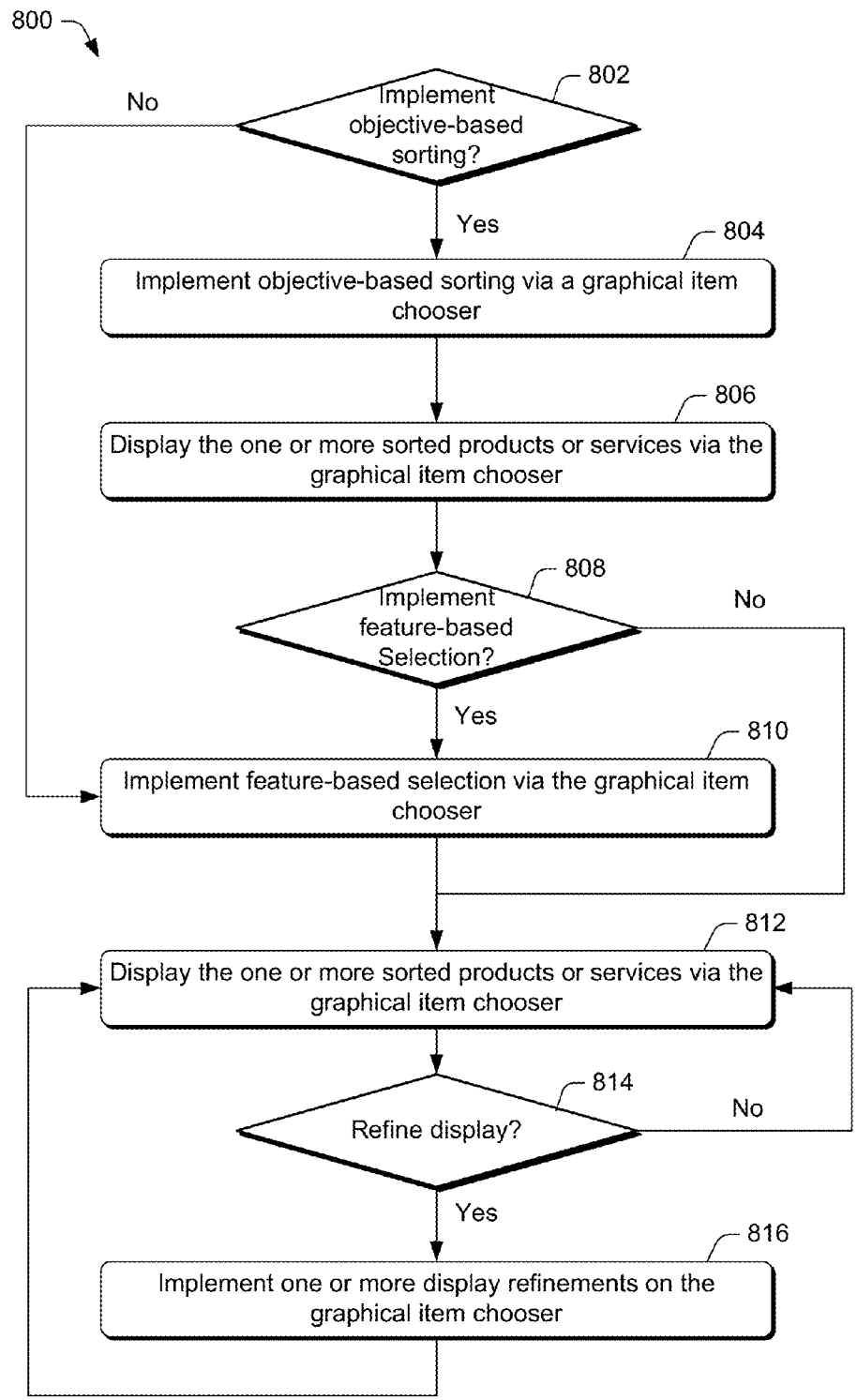
FIG. 8 is a flow diagram of an illustrative process for determining one or more product or service recommendations using the graphical item chooser, in accordance with one or more embodiments.
Figure 9:
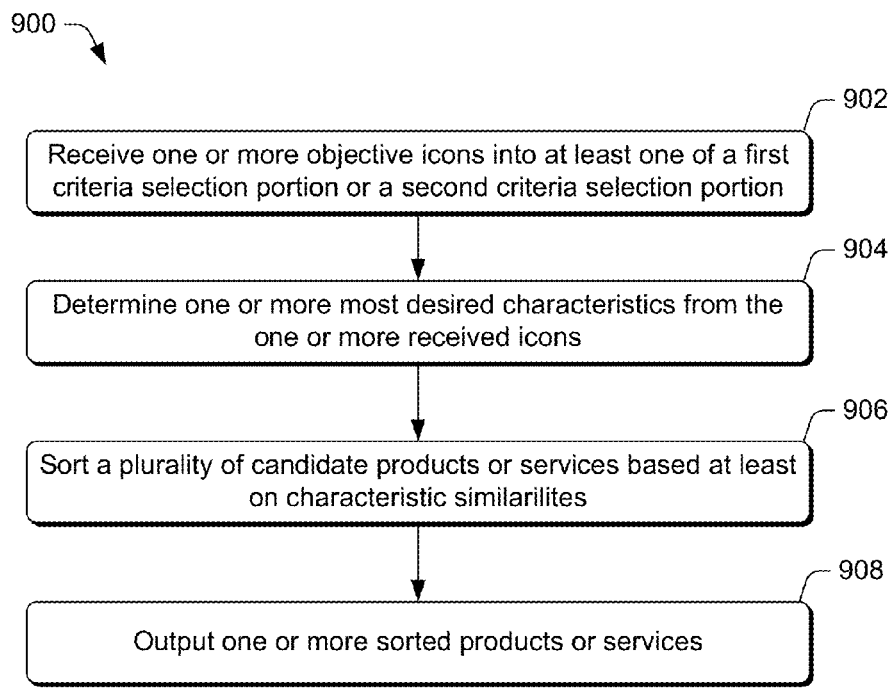
FIG. 9 is a flow diagram of an illustrative process for implementing objective-based sorting using the graphical item chooser, in accordance with one or more embodiments.
Figure 10:
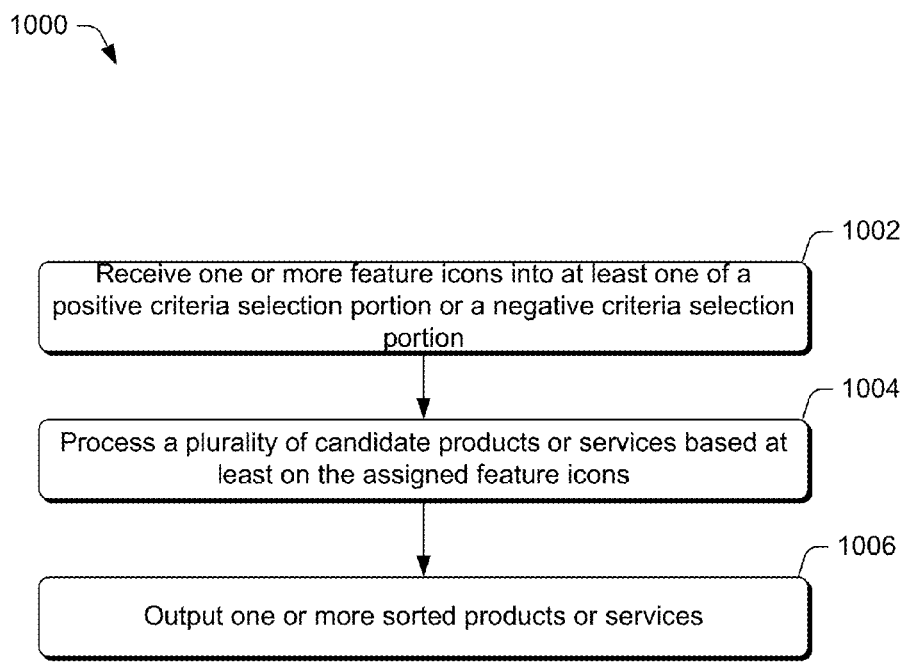
FIG. 10 is a flow diagram of an illustrative process for implement feature-based selection using the graphical item chooser, in accordance with one or more embodiments.

FIG. 8 to FIG. 10 show illustrative processes 800-1000 for implementing a graphical item chooser, such as the graphical item chooser 116, on one or more electronic devices 104. Each of the processes 800-1000 is illustrated as a collection of blocks in a logical flow graph, which represents a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 800-1000 is described with reference to the environment 100 of FIG. 1.

FIG. 8 is a flow diagram of an illustrative process for determining one or more product or service recommendations using the graphical item chooser, in accordance with one or more embodiments.

At decision block 802, a user may indicate on an interface screen 200 of the graphical item chooser 116 whether to implement the objective-based sorting of a plurality of candidate products or services. The graphical item chooser 116 may use objective-based sorting to recommend one or more products or services to the user. In at least one embodiment, the user may indicate that the objective-sorting should be implemented by placing one or more objective icons into to the primary criteria selection portion 206 and/or secondary criteria selection portion 208. If the user indicates that objective-based sorting should be implemented on the plurality of candidate products or services ("yes" at decision block 802), the process 800 may proceed to block 804.

At block 804, the graphical item chooser 116 may implement the objective-based sorting of the plurality of candidate products or services to generate a list of recommended products or services. The recommend products or services may be suitable for the accomplishment of the objectives of the user.

At block 806, the graphical item chooser 116 may display the generated a list of recommended products or services in a result display portion 210. In various embodiments, each entry in the list may include a pictorial representation of a product or service (e.g., picture 212), a written description (e.g., written description 214), and a suitability score for the product or service (e.g., score 216).

At decision block 808, the user may indicate on an interface screen 600 of the graphical item chooser 116 whether to implement the feature-based selection of the plurality of candidate products or services. In at least one embodiment, the plurality of candidate products or services may be pre-sorted via objective-based sorting. In at least one embodiments, the user may indicate that the feature-based selection should be implemented by placing one or more feature icons into the positive criteria selection portion 504 or the negative criteria selection portion 506. If the user indicates that feature-based selection should be implemented on the plurality of candidate products or services ("yes" at decision block 808), the process 800 may proceed to block 810.

At block 810, the graphical item chooser 116 may implement the feature-based selection of the plurality of candidate products or services. In some embodiments, the feature-based selection may generate a list of recommended products or services. In other embodiments in which the pluralities of candidate products or services are pre-sorted via the objective-based sorting, the previously generated list of recommended products or services may be rearranged based on the feature-based selection.

At block 812, the graphical item chooser 116 may display the generated or rearranged list of recommended products or services in a result display portion (e.g., the display portion 210 or the display portion 510).

However, returning to decision block 808, if the user indicates that feature-based selection should not be implemented on the plurality of candidate products or services ("no" at decision block 808), the process 800 may proceed directly to block 812.

Further, returning to decision block 802, if the user indicates that the objective-based sorting of the plurality of candidate products or services should not be implemented ("no" at decision block 802), the process may proceed directly to block 810. In various embodiments, the user may decline the performance of the objective-based sorting by activating the navigation button 218 of the work area 202 to proceed to the feature-based selection operation. At block 810, the graphical item chooser 116 may implement the feature-based selection of the plurality of candidate products or services to generate a list of recommended products or services (e.g., results displayed in result display portion 510).

It will be appreciated that in the process 800, at least one of the objective-based sorting or the feature-based selection is to be implemented. Otherwise, the graphical item chooser 116 may indicate that there is insufficient input to generate a list of recommended products or services.

At block 812, the graphical item chooser 116 may display the generated list of recommended products or services in a result display portion 210. In some embodiments, each product or service entry in the list may include a pictorial representation of a product or service (e.g., picture 512), a written description (e.g., written description 514), a suitability score for the product or service (e.g., score 516), a price (e.g., 610), and/or one or more links (e.g., link(s) 614).

At decision block 814, the user may indicate to the graphical item chooser 116 whether the display of the recommend products or services should be refined. In various embodiments, the refinements may include filtering out recommendations by price, manufacturer, service provider, and/or suitability score. The refinements may further include displaying one or more prices and one or more buy options for at least one product or service. The refinement may additionally include placing one or more of the recommended products or services into a short list portion 606. If the user indicates that the refinements should be implemented ("yes" at decision block 814), the process 800 may proceed to block 816.

At block 816, the graphical item chooser 116 may implement the one or more display refinements on the generated list of recommended products or services. Subsequently, the process 800 may loop back to block 812, at which point the graphical item chooser 116 may display the list of recommended products or services according to the display refinements. However, if the user indicates that no refinements are to be implemented ("no" at decision block 814), the process 800 may directly loop back to block 812.

FIG. 9 is a flow diagram of an illustrative process 900 for implementing objective-based sorting using the graphical item chooser, in accordance with one or more embodiments. The process 900 may further describe block 804 of the process 800.

At block 902, the graphical item chooser 116 may receive one or more objective icons (e.g., 204(1)-204(N)) into at least one of a primary criteria selection portion 206 or a secondary criteria selection portion 208. Each of the objective icons may represent an objective that a user may accomplish with a product or service. Moreover, each of the objective icons may be further associated with one or more characteristics of the product or service that facilitate the objective. In various embodiments, any objective icon received in the primary criteria selection portion 206 may be given a greater weight (e.g., 2x) than any objective icon received in the secondary criteria selection portion 208.

At block 904, the sort algorithm 120 may determine one or more most desired characteristics based on the received objective icons, as well other factors. For example, in the context of a camera graphical item chooser, the characteristic of "wide angle lens" may be chosen via the selection of 5 objective icons, and the characteristic of "zoom lens" may be chosen only once via the selection of a single objective icon. As a result, the graphical item chooser 116 may heuristically determine that the characteristic of "wide angle lens" is more desirable to the user than the characteristic of "zoom lens." In various embodiments, the other factors may include, but is not limited to, the weight assigned to each of the first and secondary criteria selection portions, the review rating given to each product or service, and the like.

At block 906, the sort algorithm 120 may sort the plurality of candidate products or services based at least on similarities between one or more characteristics of each candidate product or service and the one or more most desired characteristics. In various embodiments, the more closely the characteristics of a particular candidate product or service match the one or more most desirable characteristics of the ideal product or service, the more suitable the particular product or service is determined to be. In some embodiments, the determined suitability of each product or service may also influence by the review rating of the product or service. The sort algorithm 120 may dynamically sort the candidate products or services in response to any addition or removal of one or more of the objective icons 204(1)-204(N) to the primary criteria selection portion 206 and/or the secondary criteria selection portion 208.

At block 908, the graphical item chooser 116 may output the sorted products or services as a list in a result display portion, such as the result display portion 210 (FIGS. 2a and 2b). In various embodiments, the graphical item chooser 116 may output the entire list, or a top ranked portion of the list according to a predetermined limitation.

FIG. 10 is a flow diagram of an illustrative process for implement feature-based selection using the graphical item chooser, in accordance with one or more embodiments. The process 1000 may further describe block 810 of the process 800.

At block 1002, the graphical item chooser 116 may receive one or more feature icons (e.g., 502(1)-502(N)) into at least one of a positive criteria selection portion 504 or a negative criteria selection portion 506. Each of the feature icons may represent a particular feature of the product or service. Any feature icon received into positive criteria selection portion may represent a feature that the user desires in a product or service. Conversely, any feature icon received into the negative criteria selection may represent a feature that the user does not want in a product or service. In alternative embodiments, the user may select desired and/or undesirable features via other interfaces, such as interfaces that enable variable rating on a gradual scale via slider bars or selectable stars, or the positioning of the feature icons in a drag and drop variable rating portion described above in the context of FIGS. 5a and 5b.

At block 1004, the graphical item chooser 116 may process a plurality of candidate products or services based at least one the received features icons or the variable feature ratings. In embodiments where the objective-based sorting was bypassed, the graphical item chooser 116 may process a plurality of candidate products or service and exclude any product or service that includes features that the user does not desire. The graphical item chooser 116 may also exclude any product or service that does not have the features that the user desires. Following the exclusions, the graphical item chooser 116 may generate a list of the remaining products or services. In some of these embodiments, the list of the remaining products or services may be ranked according to their review rating score (e.g., from the highest review rating to the lowest review rating).

In other embodiments in which objective-based sorting was previously performed, the graphical item chooser 116 may rearrange a previously generated ranked list of products or services. The rearrangement may include exclude any product or service that includes features that the user does not desire from the list. The rearrangement may also include exclude any product or service that does not have the features that the user desires form the list. During the processing, the graphical item chooser 116 may also dynamically determine if one or more feature icons have been removed from the positive criteria selection portion 504 and/or the negative criteria selection portion 506. If so, the graphical item chooser 116 may restore the affected product or service back into the list of products or services for display.

In alterative embodiments, the graphical item chooser 116 may modify the score/reviewing rating of each product or service via positive weighting or negative weighting. The positive weighting or negative weighting may be implemented based on the placement of corresponding feature icons in the positive criteria selection portion 504 or the negative criteria selection portion 506.

At block 1006, the graphical item chooser 116 may output the processed list of products or services in a result display portion, such as the result display portion 510 (FIGS. 5a and 5b). In various embodiments, the graphical item chooser 116 may output the entire list or a top ranked portion of the list according to a predetermined limitation.

In summary, the graphical item chooser in accordance with the various embodiments may enable a user to select an appropriate product or service without searching for information from multiple sources, or possess in-depth knowledge regarding the product or service. It will be appreciated that while the embodiments above are described above with respect to cameras, the graphical item chooser may be used for a variety of searches. For example, but not as limitations, these searches may include searches for a particular employee/contractor from a pool of employees/contractors, a college or university from various higher education institutions, a particular pet from various species of animals, a particular travel destination/package from a plurality of travel destinations/packages, or any other search where a decision maker is presented with a plurality of possible options, and imperfect knowledge regarding each possible options.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer implemented method, comprising:
   causing display of a user interface screen on a computing device of a particular user;
   detecting a first detected movement of one or more objective icons from a work area of the user interface screen into a primary criteria selection area of the user interface screen that is caused by the particular user at the computing device;
   detecting a second detected movement of one or more other objective icons from the work area into a secondary criteria selection area of the user interface screen that is caused by the particular user at the computing device, a first characteristic associated with a first objective icon placed in the primary criteria selection area being more desirable than a second characteristic associated with a second objective icon placed in the secondary criteria selection area;
   detecting that a third objective icon remains within the work area and is not placed in either the primary criteria selection area or the secondary criteria selection area, wherein each of the first characteristic and the second characteristic is more desirable than a third characteristic associated with the third objective icon that is within the work area;
   determining a desirability of individual characteristics of the first characteristic and the second characteristic based at least in part on a frequency that the individual characteristics are selected by the particular user for association with a search for a plurality of candidate products or services, the frequency that the individual characteristics are selected corresponding to a number of times that objective icons associated with the individual characteristics are selected via at least one of the first detected movement or the second detected movement caused by the particular user;
   sorting the plurality of candidate products or services for the particular user based at least in part on a number of characteristics of individual candidate products or services that correspond to the desirability of the individual characteristics associated with the objective icons that are moved into the primary criteria selection area and the secondary criteria selection area by the particular user, the sorting to provide one or more sorted products or services; and
   causing display of images of the one or more sorted products or services, along with a corresponding price to purchase each of the one or more sorted products or services, on the user interface screen on the computing device, to facilitate purchase of at least one of the one or more sorted products or services.

2. The computer implemented method of claim 1, wherein:
   a first desired characteristic represented by the first objective icon in the primary criteria selection area is given a first positive weight during the sorting; and
   a second desired characteristic represented by the second objective icon in the secondary criteria selection area is given a second positive weight during the sorting, the first positive weight being higher than the second positive weight, and the second positive weight being higher than zero.

3. The computer implemented method of claim 1, further comprising ascertaining that at least one objective icon of the one or more objective icons or the one or more other objective icons have been removed from at least one of the primary criteria selection area or the secondary criteria selection area, and wherein the sorting includes sorting the plurality of candidate products or services based at least in part on the one or more objective icons and the one or more other objective icons that remain in the primary criteria selection area or the secondary criteria selection area.

4. The computer implemented method of claim 1, further comprising:
   detecting a third detected movement of one or more feature icons into at least one of a positive criteria selection portion or a negative criteria selection portion of the user interface screen, a feature icon of the one or more feature icons corresponding to a feature of the plurality of candidate products or services; and
   filtering out one or more of the one or more sorted products or services based at least in part on the one or more feature icons, a product or service being filtered out based at least in part on determining that the product or service does not include a first feature corresponding to a first feature icon in the positive criteria selection portion or that the product or service includes a second feature corresponding to a second feature icon in the negative criteria selection portion,
   wherein the causing display includes causing display of the one or more sorted products or services on the user interface screen without causing display of the one or more of the one or more sorted products or services that were filtered out.

5. The computer implemented method of claim 4, further comprising:
   ascertaining that the first feature icon in the positive criteria selection portion has been removed from the positive criteria selection portion; and
   restoring at least one candidate product or service that does not include the first feature corresponding to the first feature icon in the positive criteria selection portion into the one or more sorted products or services that was previously filtered out for not including the first feature corresponding to the first feature icon in the positive criteria selection portion.

6. The computer implemented method of claim 4, further comprising:
   ascertaining that the second feature icon in the negative criteria selection portion has been removed from the negative criteria selection portion; and
   restoring at least one candidate product or service that includes the second feature corresponding to the second feature icon in the negative criteria selection portion into the one or more sorted products or services that was previously filtered out for including the second feature corresponding to the second feature icon in the negative criteria selection portion.

7. The computer implemented method of claim 1, wherein the sorting further includes sorting the plurality of candidate products or services based at least on a number of characteristics of individual candidate products or services that corresponds to the first characteristic and the second characteristic.

8. The computer implemented method of claim 1, wherein the one or more objective icons represents one or more physical characteristics of the plurality of candidate products or services.

9. The computer implemented method of claim 1, further comprising determining that the first objective icon is associated with at least the first characteristic and a third characteristic, the first characteristics and the third characteristic being more desirable that the second characteristic associated with the second objective icon.

10. The computer implemented method of claim 1, further comprising:
    determining a first characteristic frequency associated with the first characteristic corresponding to a first number of times that the one or more objective icons associated with the first characteristic are moved to the primary criteria selection area; and
    determining a second characteristic frequency associated with the second characteristic corresponding to a second number of times that the one or more other objective icons associated with the second characteristic are moved to the secondary criteria selection area.

11. One or more non-transitory storage media storing computer-executable instructions that, when executed, cause one or more processors to perform acts comprising:
    classifying one or more objective icons that are moved from a work area of a user interface screen to a primary criteria selection area of the user interface screen via a first input from a particular user, the first input identifying the one or more objective icons as primary objective icons, wherein a first objective icon of the one or more objective icons represents a first feature of a product or service that is requested for purchase, wherein the first feature represents a first plurality of characteristics of the product or service that is requested for purchase;
    classifying one or more additional objective icons that are moved from the work area to a secondary criteria selection area of the user interface screen via a second input from the particular user, the second input identifying the one or more additional objective icons as secondary objective icons, at least one primary objective icon of the primary objective icons representing multiple desired primary characteristics of the product or service that is requested for purchase and at least one secondary objective icon of the secondary objective icons representing multiple desired secondary characteristics of the product or service that is requested for purchase;
    determining a desirability of individual characteristics of the primary characteristics of the product or service that is requested for purchase and the secondary characteristics of the product or service that is requested for purchase, based at least in part on a frequency that a primary characteristic or a secondary characteristic is selected by the particular user for association with a search for the product or service, the frequency of the primary characteristic or the secondary characteristic being selected corresponding to a number of times that objective icons associated with the primary characteristic or the secondary characteristic are selected via movement of the one or more objective icons or movement of the one or more additional objective icons by at least one of the first input or the second input from the particular user;
    sorting a plurality of candidate products or services for the particular user based at least in part on similarities between one or more characteristics of individual candidate products or services of the plurality of candidate products and services and the desirability of the individual characteristics represented by the one or more objective icons or by the one or more additional objective icons, wherein the sorting weights a similarity between a characteristic of the individual candidate products or services and a desired primary characteristic of the multiple desired primary characteristics more than a similarity between another characteristic of the individual candidate products or services and a desired secondary characteristic of the multiple desired secondary characteristics, the sorting providing one or more sorted products or services; and
    serving for display the one or more sorted products or services on the user interface screen based at least in part on the sorting of the plurality of candidate products or services.

12. The one or more non-transitory storage media of claim 11, further comprising instructions that when executed, cause the one or more processors to perform at least one of expanding an objective icon or instantiating additional information regarding the objective icon in response to an emphasis action on the objective icon.

13. The one or more non-transitory storage media of claim 11, wherein the serving for display includes serving a list of suitable products or services for display in a first order or a second order, the first order being from a most suitable to a least suitable, the second order being from the least suitable to the most suitable based at least in part on the sorting.

14. The one or more non-transitory storage media of claim 11, wherein the sorting includes generating a suitability score for the individual candidate products or services based at least in part on the similarities between a respective characteristics of the individual candidate products or services and the desired primary characteristic and the desired secondary characteristic.

15. The one or more non-transitory storage media of claim 11, further comprising instructions that when executed, cause the one or more processors to perform an act of ascertaining that one or more of the one or more objective icons or one or more of the one or more additional objective icons have been removed from at least one of the primary criteria selection area or the secondary criteria selection area, wherein the sorting includes determining one or more most desired characteristics of the product or service based at least in part on at least one remaining objective icon.

16. The one or more non-transitory storage media of claim 11, further comprising instructions that when executed, cause the one or more processors to perform acts of:
    filtering out one or more of the one or more sorted products or services, a product or service of the one or more sorted products or services being filtered out based at least in part on determining that the product or service does not include a second feature corresponding to a first objective icon in a positive criteria selection portion or based at least in part on determining that the product or service includes a second feature corresponding to a second feature icon in a negative criteria selection portion; and causing display of the one or more sorted products or services without causing display of the one or more of the one or more sorted products or services on the user interface screen.

17. The one or more non-transitory storage media of claim 16, further comprising instructions that when executed, cause the one or more processors to perform acts of:
   ascertaining that the first feature icon in the positive criteria selection portion has been removed from the positive criteria selection portion; and
   adding at least one product or service that does not include the first feature corresponding to the first feature icon in the positive criteria selection portion to the one or more sorted products or services.

18. The one or more non-transitory storage media of claim 16, further comprising instructions that when executed, cause the one or more processors to perform acts of:
   ascertaining that the second feature icon in the negative criteria selection portion has been removed from the negative criteria selection portion; and
   adding at least one product or service that includes the second feature corresponding to the second feature icon in the negative criteria selection portion to the one or more sorted products or services.

19. The one or more non-transitory storage media of claim 11, wherein the serving for display includes serving for display at least one of a pictorial representation, a suitability score, a written description, a price, a review site hyperlink, a retailer hyperlink, or a side-by-side comparison with one or more other products or services for at least one displayed product or service.

20. The one or more non-transitory storage media of claim 11, wherein the serving for display includes serving for display a price for a displayed product or service that is one of a lowest price, a highest price, an average price, or a median price of retail prices from a plurality of retailers.

21. The one or more non-transitory storage media of claim 11, further comprising instructions that when executed, cause the one or more processors to perform an act of refining the products or services served for display by excluding from display at least one product or service according to one of price, manufacturer, service provider, or suitability score.

22. The one or more non-transitory storage media of claim 11, further comprising instructions that when executed, cause the one or more processors to perform an act of refining the products or services served for display by sorting the products or services according to one of price, manufacturer, service provider, or suitability score.

23. The one or more non-transitory storage media of claim 11, further comprising instructions that when executed, cause the one or more processors to perform an act of receiving at least one product or service from the products or services served for display into a group, and sorting the group according to one of price, manufacturer, service provider or suitability score based at least in part on at least two products or services being received into the group.

24. The one or more non-transitory storage media of claim 11, wherein the one or more objective icons represents one or more physical characteristics of the plurality of candidate products or services.

25. One or more non-transitory storage media storing computer-executable instructions that, when executed, cause one or more processors to perform acts comprising:
   ascertaining numerical rankings for a plurality of features, individual numerical rankings of the plurality of features indicating individual desirability of the plurality of features to a particular user, wherein the ascertaining comprises:
      detecting a first detected movement of a first one or more feature icons from a work area of a user interface screen into a primary criteria selection area of the user interface screen,
      detecting a second detected movement of a second one or more feature icons from the work area into a secondary criteria selection area of the user interface screen,
      wherein a first feature icon of the first one or more feature icons represents a first feature of a product that is to be purchased, wherein a second feature icon of the second one or more feature icons represents a second feature of the product that is to be purchased, wherein the first feature is more desirable than the second feature, wherein the first feature represents a first plurality of characteristics of the product, and wherein the second feature represents a second plurality of characteristics of the product, and
      determining a desirability of individual features of the plurality of features based at least in part on a frequency that individual feature icons of the first one or more feature icons or the second one or more feature icons are selected by the particular user for association with a search for a plurality of candidate products or services, the frequency that the individual feature icons are selected corresponding to a number of times that the individual feature icons are selected via at least one of the first detected movement or the second detected movement;
   ranking the plurality of features according to corresponding numerical rankings; and
   serving for display a group of products or services on the user interface screen of the particular user based at least in part on the ranking of the plurality of features.

26. The one or more non-transitory storage media of claim 25, further comprising instructions that when executed, cause the one or more processors to perform acts of:
   automatically classifying a first predetermined quantity of ranked features with highest numerical rankings as corresponding positive features that are desirable to the particular user, and a second predetermined quantity of ranked features with lowest numerical rankings as corresponding negative features that are undesired by the particular user;
   modifying the group of products or services to provide a modified group of products or services by removing one or more products or services from the group, a product or service being removed based at least in part on determining that the product or service does not include a positive feature or based at least in part on determining that the product or service includes a negative feature; and
   receiving the numerical rankings of the plurality of features that are provided using a sliding bar scale or selectable stars.

27. The one or more non-transitory storage media of claim 26, further comprising instructions that when executed, cause the one or more processors to perform acts of:
   reclassifying a particular positive feature as another negative feature; and
   restoring at least one product or service that does not include the particular positive feature into the group of products or services based at least in part on determining that the at least one product or service was previously removed for not including the particular positive feature.

28. The one or more non-transitory storage media of claim 26, further comprising instructions that when executed, cause the one or more processors to perform acts of:
reclassifying a particular negative feature as another positive feature; and
restoring at least one product or service that includes the particular negative feature into the group of products or services based at least in part on determining that the at least one product or service was previously removed for including the particular negative feature.

29. The one or more non-transitory storage media of claim 26, wherein the serving for display includes serving for display at least one of a pictorial representation, a suitability score, a written description, a price, a review site hyperlink, a retailer hyperlink, or a side-by-side comparison with one or more other products or services for one or more products or services in the modified group of products or services.

30. The one or more non-transitory storage media of claim 26, wherein the serving for display includes serving for display a price for a product or service in the modified group of products or services that is one of a lowest price, a highest price, an average price, or a median price of retail prices from a plurality of retailers.

31. The one or more non-transitory storage media of claim 26, further comprising instructions that when executed, cause the one or more processors to perform an act of refining the modified group of products or services by excluding at least one product or service according to one of price, manufacturer, service provider, or suitability score.

32. The one or more non-transitory storage media of claim 26, further comprising instructions that when executed, cause the one or more processors to perform an act of refining the modified group of products or services by sorting the modified group according to one of price, manufacturer, service provider, or suitability score.

33. The one or more non-transitory storage media of claim 26, further comprising instructions that when executed, cause the one or more processors to perform an act of receiving at least one product or service from the modified group of products or services into a new group, and sorting the new group according to one of price, manufacturer, service provider or suitability score in response to at least two products or services are received into the new group.

34. The one or more non-transitory storage media of claim 25, wherein each of the plurality of features corresponds to a different feature icon, and wherein the ascertaining includes at least one of ascertaining the numerical rankings of the features based on relative positions of a plurality of feature icons or detecting relative positions of the plurality of feature icons in an icon arrangement area of the user interface screen.

* * * * *